United States Patent
Mohr et al.

(10) Patent No.: US 11,199,202 B2
(45) Date of Patent: Dec. 14, 2021

(54) ACOUSTIC ATTENUATOR FOR A TURBOMACHINE AND METHODOLOGY FOR ADDITIVELY MANUFACTURING SAID ACOUSTIC ATTENUATOR

(71) Applicant: Dresser-Rand Company, Olean, NY (US)

(72) Inventors: Byron L. Mohr, Olean, NY (US); Christopher Guerra, Olean, NY (US); Scott MacWilliams, Allegany, NY (US)

(73) Assignee: DRESSER-RAND COMPANY, Olean, NY (US)

( * ) Notice: Subject to any disclaimer, the term of this patent is extended or adjusted under 35 U.S.C. 154(b) by 226 days.

(21) Appl. No.: 16/631,250

(22) PCT Filed: Jul. 16, 2018

(86) PCT No.: PCT/US2018/042209
§ 371 (c)(1),
(2) Date: Jan. 15, 2020

(87) PCT Pub. No.: WO2019/018252
PCT Pub. Date: Jan. 24, 2019

(65) Prior Publication Data
US 2020/0217332 A1  Jul. 9, 2020

Related U.S. Application Data

(60) Provisional application No. 62/535,266, filed on Jul. 21, 2017.

(51) Int. Cl.
*F04D 29/66* (2006.01)
*G06T 17/00* (2006.01)
(Continued)

(52) U.S. Cl.
CPC .............. *F04D 29/66* (2013.01); *B33Y 10/00* (2014.12); *B33Y 80/00* (2014.12); *G06T 17/00* (2013.01);
(Continued)

(58) Field of Classification Search
CPC ......... F04D 29/66; B33Y 10/00; B33Y 80/00; G06T 17/00; G10K 11/162; F05D 2230/50; F05D 2260/96
See application file for complete search history.

(56) References Cited

U.S. PATENT DOCUMENTS 6,550,574 B2  4/2003  Liu
6,601,672 B2  8/2003  Liu
(Continued)

FOREIGN PATENT DOCUMENTS

EP  1857656 A2  11/2007
WO  2016073193 A1  5/2016

OTHER PUBLICATIONS

Lee, Mokwon, et al., "Support-Free Hollowing for 3D Printing via Voronoi Diagram of Ellipses", Aug. 23, 2017, pp. 1-30.
(Continued)

*Primary Examiner* — Forrest M Phillips

(57) ABSTRACT

An acoustic attenuator for a turbomachine and methodology for additively manufacturing the acoustic attenuator are provided. The acoustic attenuator includes an annular body (202) having an outer surface (204) and an inner surface (206). The inner surface of the annular body may define a bore (208) extending along a longitudinal axis (209) of the acoustic attenuator between a first end and a second end of the acoustic attenuator. The annular body may be formed by a plurality of axially-successive cross-sectional layers (e.g., 632, 634, 636) unitized between the first end and the second end of the acoustic attenuator. The plurality of axially-
(Continued)

successive cross-sectional layers may be transversely disposed relative to the longitudinal axis of the acoustic attenuator. At least some axially-successive cross-sectional layers of the plurality of axially-successive cross-sectional layers (e.g., 632, 634, 636) defining a pocket (214) disposed between the outer surface and the inner surface of the annular body. At least a segment of a periphery of the pocket comprises two sides (1452, 1454) arranged to join at a common end point to form an apex (1460) of the pocket.

19 Claims, 18 Drawing Sheets

(51) Int. Cl.
  *G10K 11/162* (2006.01)
  *B33Y 10/00* (2015.01)
  *B33Y 80/00* (2015.01)

(52) U.S. Cl.
  CPC ........ *G10K 11/162* (2013.01); *F05D 2230/50* (2013.01); *F05D 2260/96* (2013.01)

(56) References Cited

U.S. PATENT DOCUMENTS

| | | | |
|---|---|---|---|
| 6,669,436 B2 | 12/2003 | Liu | |
| 6,918,740 B2* | 7/2005 | Liu | F04D 29/665 415/1 |
| 7,984,787 B2 | 7/2011 | Liu et al. | |
| 8,061,961 B2* | 11/2011 | Liu | F01D 25/30 415/1 |
| 8,596,413 B2 | 12/2013 | Seib | |
| 8,955,643 B2 | 2/2015 | Liu | |
| 9,878,492 B2 | 1/2018 | Kanada | |
| 9,919,683 B2 | 3/2018 | Boland | |
| 11,138,789 B1* | 10/2021 | Arora | G06T 17/20 |
| 2010/0187038 A1* | 7/2010 | Liu | F16L 55/052 181/233 |
| 2015/0071760 A1* | 3/2015 | Liu | F04D 29/441 415/1 |
| 2016/0230778 A1* | 8/2016 | Mekid | G10K 11/172 |
| 2017/0334023 A1* | 11/2017 | Mohr | B33Y 10/00 |

OTHER PUBLICATIONS

Livesu, M. et al., "From 3D Models to 3D Prints: an Overview of the Processing Pipeline (preprint)", STAR—State of the Art Report, vol. 36, No. 2, Computer Graphics Forum, The Eurographics Association and John Wiley & Sons Ltd., 2017, pp. 1-27.

PCT International Search Report and Written Opinion dated Oct. 1, 2018 corresponding to PCT Application No. PCT/US2018/042209 filed Jul. 16, 2018.

\* cited by examiner

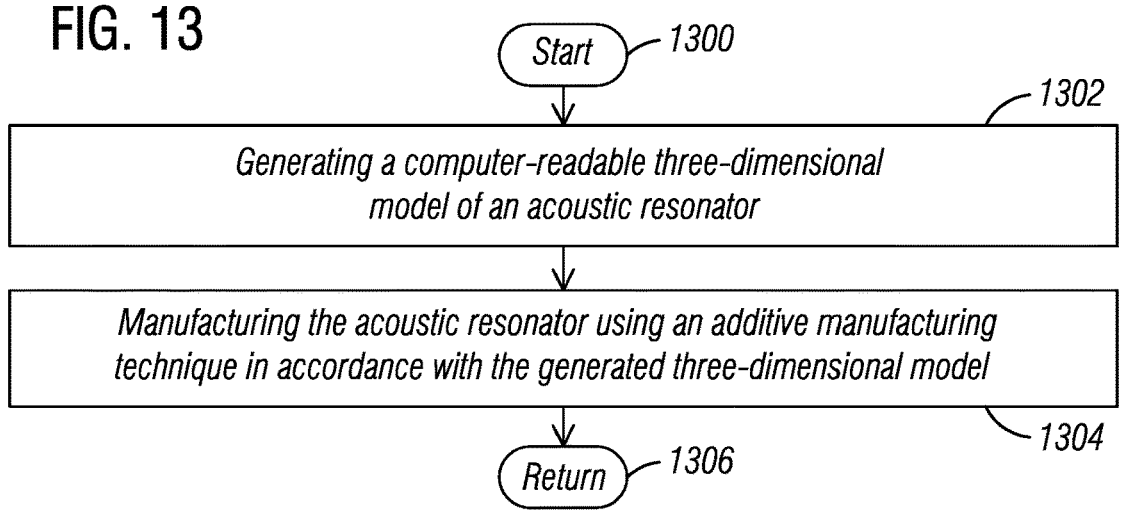
FIG. 13
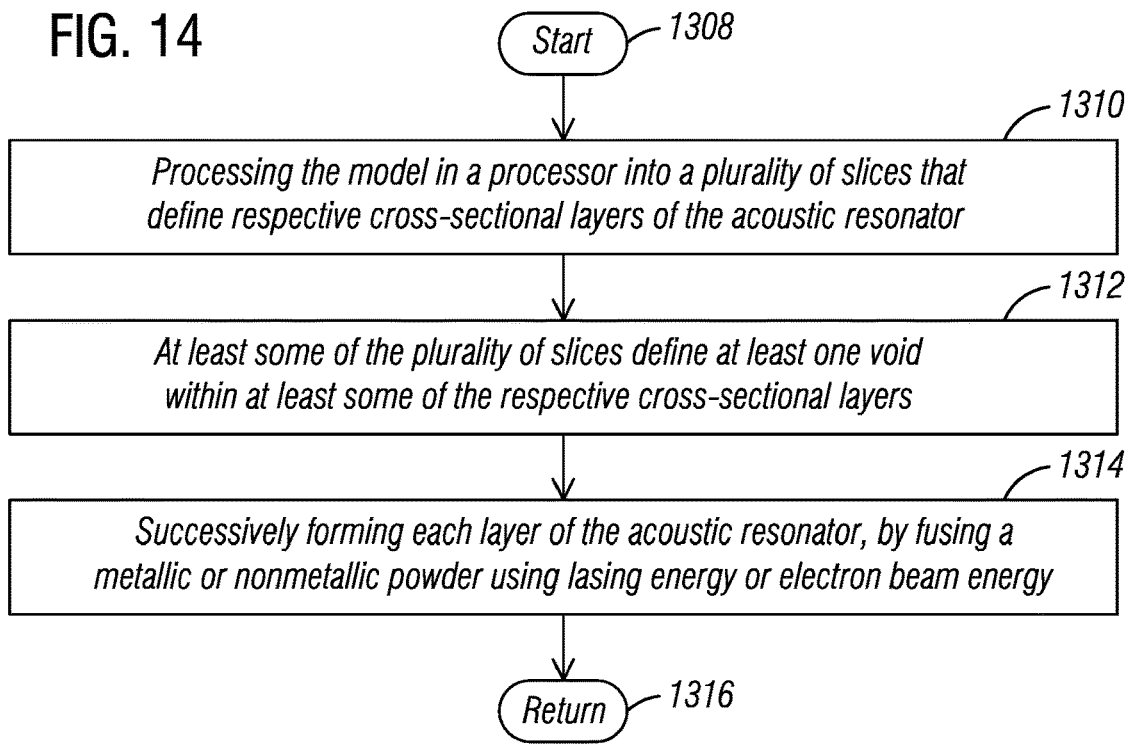
FIG. 14
FIG. 15
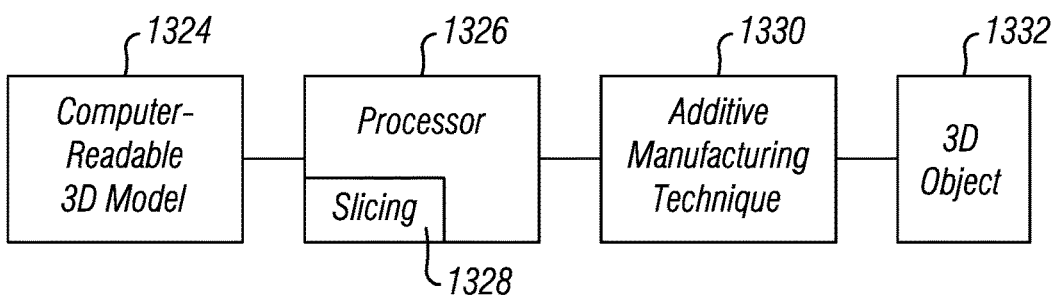

ACOUSTIC ATTENUATOR FOR A TURBOMACHINE AND METHODOLOGY FOR ADDITIVELY MANUFACTURING SAID ACOUSTIC ATTENUATOR

This application claims benefit of the Jul. 21, 2017 filing date of U.S. provisional application 62/535,266, which is incorporated by reference herein.

BACKGROUND

Turbomachinery, such as turbines and compressors, may be utilized in a myriad of industrial processes and applications. A typical turbomachine produces a relatively high level of acoustic noise, which is a nuisance to people in the vicinity of the turbomachine. This noise can also cause high level of vibrations and could eventually lead to structural issues.

Accordingly, various measures have been implemented attempting to suppress the high level of noise in turbomachines. See for example US patents or published patent applications: U.S. Pat. Nos. 6,550,574; 6,601,672; 6,669,436; 6,918,740; 7,984,787; 8,061,961; 8,596,413; 8,955,643; US 2015/0071760; and US 2016/0230778, the disclosures of which are herein incorporated by reference in their entirety.

BRIEF SUMMARY

Disclosed embodiments may provide an acoustic attenuator for a turbomachine including an annular body having an outer surface and an inner surface. The inner surface of the annular body may define a bore extending along a longitudinal axis of the acoustic attenuator between a first end and a second end of the acoustic attenuator. The annular body may be formed by a plurality of axially-successive cross-sectional layers unitized between the first end and the second end of the acoustic attenuator. The plurality of axially-successive cross-sectional layers transversely disposed relative to the longitudinal axis of the acoustic attenuator. At least some axially-successive cross-sectional layers of the plurality of axially-successive cross-sectional layers defining a pocket disposed between the outer surface and the inner surface of the annular body. At least a segment of a periphery of the pocket comprises two sides arranged to join at a common end point to form an apex of the pocket.

Disclosed embodiments may also provide method for manufacturing an acoustic attenuator for a turbomachine. The method allows generating a computer-readable three-dimensional (3D) model of the acoustic attenuator. The model defines a digital representation including an annular body having an outer surface and an inner surface. The inner surface of the annular body defining a bore extending along a longitudinal axis of the acoustic attenuator between a first end and a second end of the acoustic attenuator. The annular body may be formed by a plurality of axially-successive cross-sectional layers unitized between the first end and the second end of the acoustic attenuator. The plurality of axially-successive cross-sectional layers transversely disposed relative to the longitudinal axis of the acoustic attenuator. At least some axially-successive cross-sectional layers of the plurality of axially-successive cross-sectional layers defining a pocket disposed between the outer surface and the inner surface of the annular body. At least a segment of a periphery of the pocket includes two sides arranged to join at a common end point to form an apex of the pocket. A respective side of the two sides arranged to join at the common end point defines a respective angle relative to a line that bisects the pocket along the longitudinal axis of the acoustic attenuator. The respective angle may be selected so that the plurality of axially-successive cross-sectional layers is self-supporting. At least some of the axially-successive cross-sectional layers that define the pocket further defining a set of conduits arranged to provide fluid communication between the pocket and the bore. The method further allows manufacturing the acoustic attenuator using an additive manufacturing technique in accordance with the generated three-dimensional model.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 13 is a flow chart listing certain non-limiting steps that may be used in a disclosed method for manufacturing disclosed acoustic attenuators.

FIG. 14 is a flow chart listing further non-limiting steps that may be used in the disclosed method for manufacturing disclosed acoustic attenuators.

FIG. 15 is a flow sequence in connection with the disclosed method for manufacturing disclosed acoustic attenuators.

DETAILED DESCRIPTION

Figure 18:
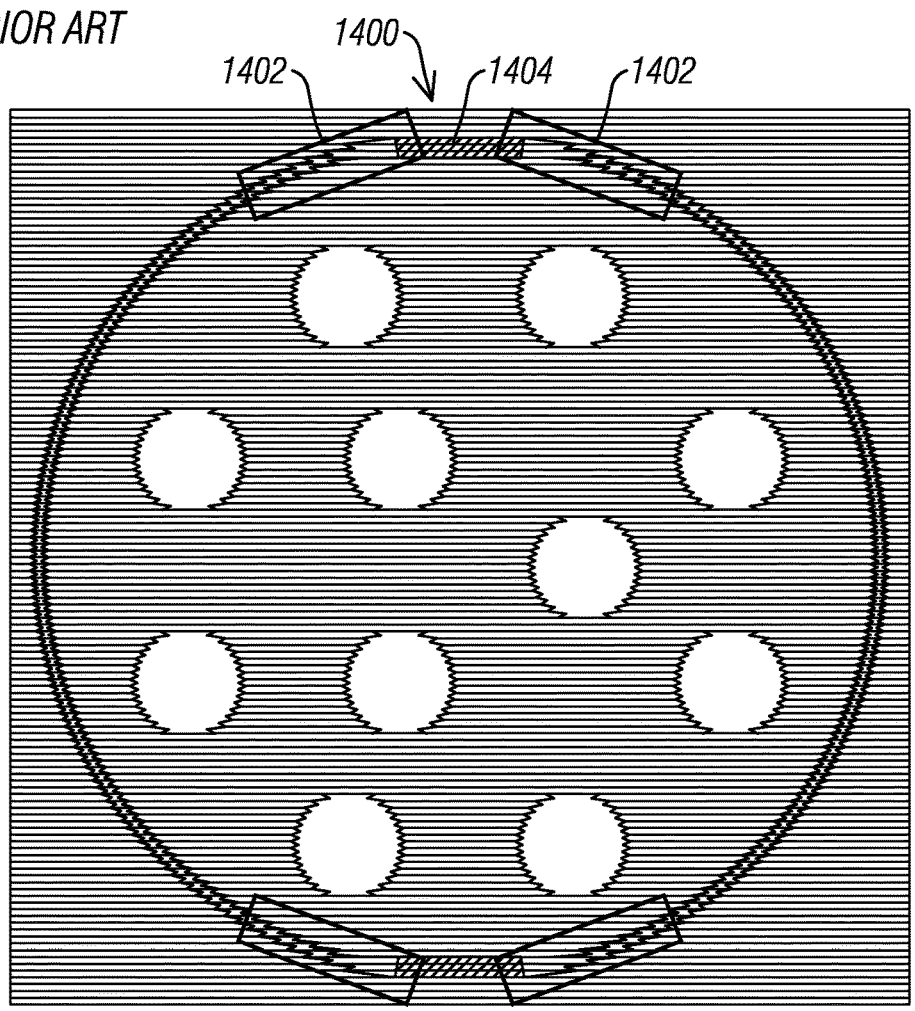
FIG. 18 is cross-section illustrating certain prior art process issues that can arise when 3D-printing shapes involving transitioning to/from (and including) a segment with a flat slope, which may be beyond the overhang capabilities of typical 3D printers.
Figure 19:
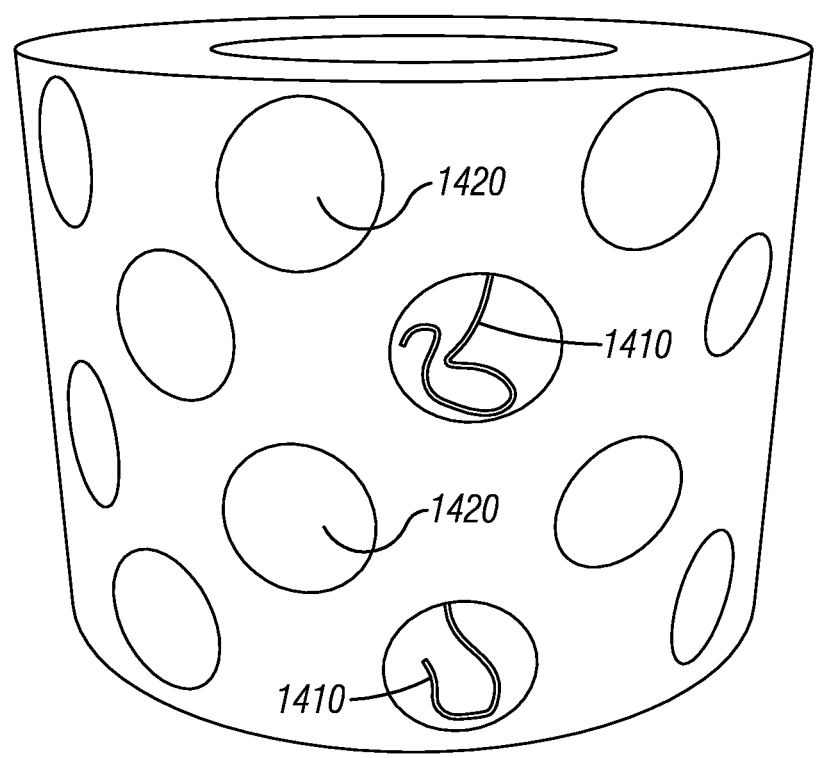
FIG. 19 is an isometric view illustrating further prior art process issues that can arise when 3D-printing shapes, such as shown in FIG. 18, without support, and thus subject to drooping.

The inventors of the present invention have recognized that known 3D-printing techniques may introduce some geometric distortion when printing certain shapes, such as without limitation, a circle 1400, shown in FIG. 18. This is primarily due to the following issues: Firstly, as can be appreciated in FIG. 18, a practical layer thickness may not allow for smooth walls in segments (e.g., within rectangles 1402) transitioning to/from a segment with a flat slope. Secondly, as can be further appreciated in FIG. 18 when, for example, a top-most layer is formed in a segment 1404 having a zero slope, this layer may have to bridge a relatively large distance. Consequently, as may be appreciated in FIG. 19, some of the fabricating material 1410 (e.g., in a melting condition while doing the 3D printing) may droop down or hang down into a cavity 1420 defined by the circular walls. Cumulatively, these drooping or hang downs can lead to waste of fabrication material. It is possible to reduce the drooping or hang downs by adding supports inside of the cavity, but this would increase print time and post processing time.

In view of recognition of the foregoing issues, the inventors of the present invention propose improved methodology that allows for such shapes to be three-dimensionally printed with practically no drooping and/or without supports. This is effective to reduce both print time, waste of material, and post processing time. Also printing without supports is conducive to a finalized part free from further machining operations. Disclosed embodiments may involve acoustic attenuators that can be printed, as a unitary structure with a cover and/or may involve multiple pockets in fluid communication with one another. This is further effective to fabricating structures that more accurately reach a desired shape.

The present inventors have further recognized that in an array of pockets that may be involved in an acoustic attenuator, the main parameters affecting acoustic attenuation properties would the volumetric footprint of the pockets, such as the cross-sectional area and depth of the pockets. Therefore, so long as the volumetric footprint of the pockets meets its desired target, the cross-section of the pocket can be any cross-sectional shape that meets the foregoing requirement. In view of such recognition, to improve printability of a given cross-sectional shape, such as to avoid printing a circular cross-section subject to the issues noted above, the given cross-sectional shape can be appropriately tailored to other shapes not subject to such issues so long as the appropriate volumetric footprint of the pockets is met.

Figure 16A:
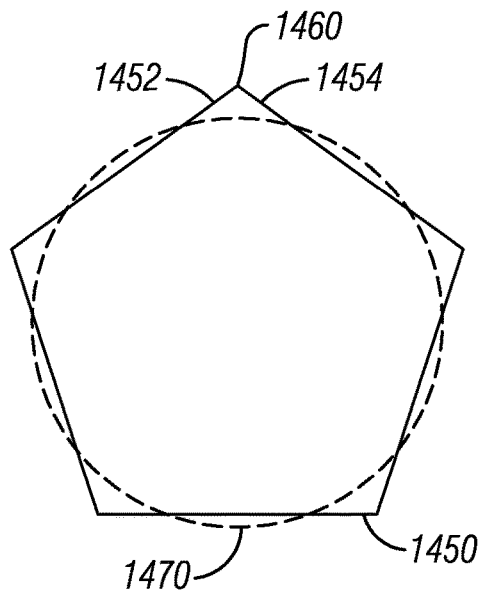
FIG. 16 shows respective non-limiting cross-sectional shapes and arrangements that may be used in pockets and/or conduits that may be fabricated in disclosed acoustic attenuators.
Figure 16B:
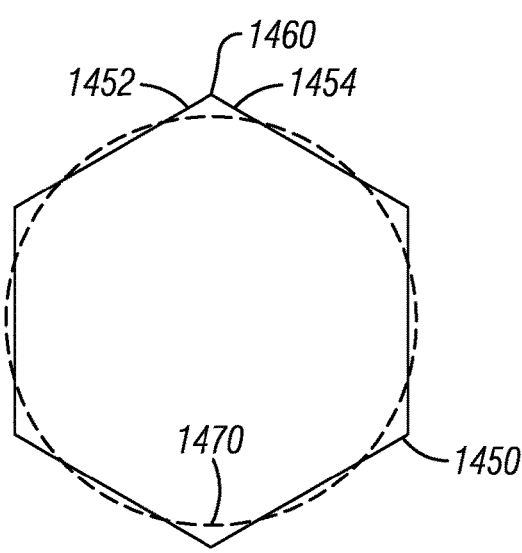
Figure 16C:
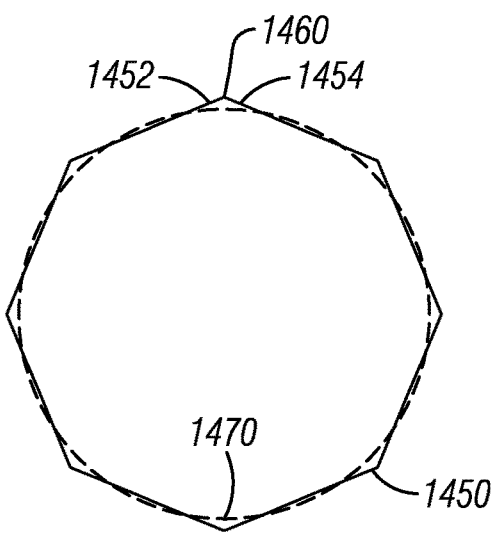
Figure 16D:
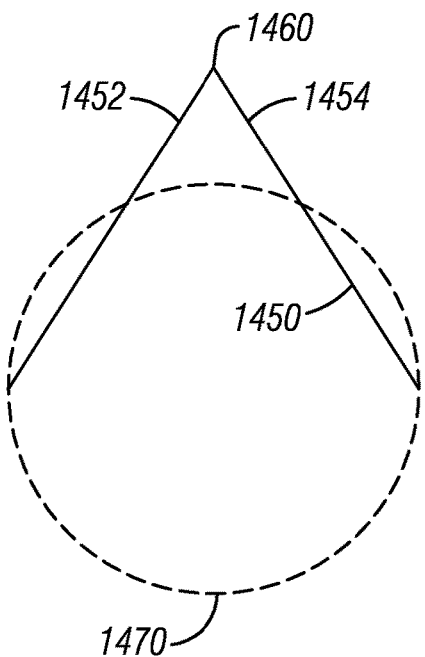
Figure 16G:
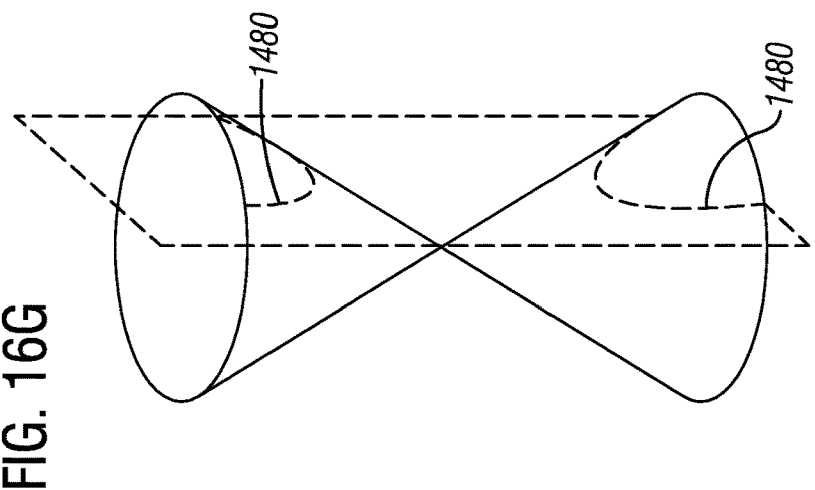
Figure 16F:
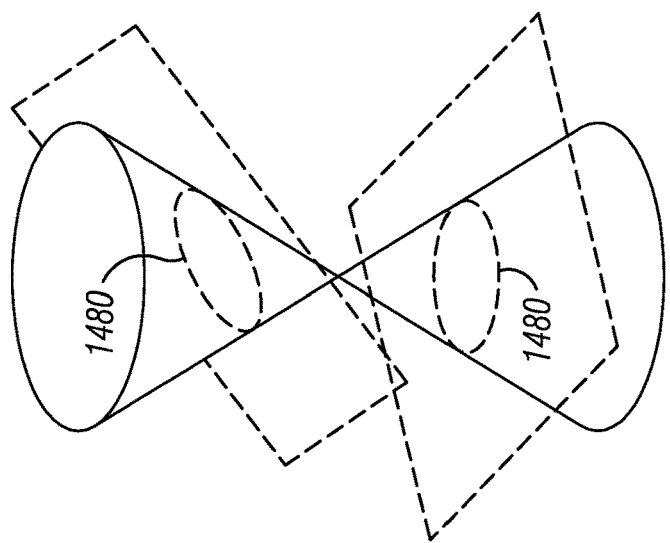
Figure 16E:
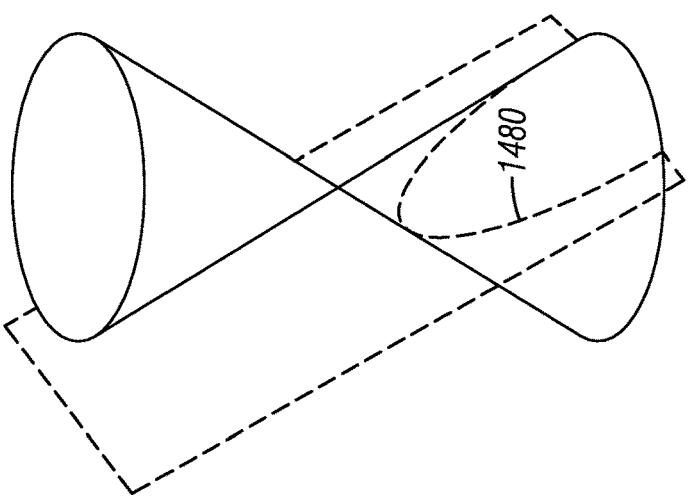

FIG. 16 shows respective non-limiting cross-sectional shapes that can be used in pockets and/or conduits that may be fabricated in disclosed acoustic attenuators, such as polygonal cross-sectional shapes 1450, such as pentagonal cross-sectional shape (FIG. 16A), hexagonal cross-sectional shape (FIG. 16B), octagonal cross-sectional shape (FIG. 16C); conic cross-sectional shapes 1480 (FIG. 16E through 16G); and a combination of two or more of said cross-sectional shapes, such as involving a semicircle and a triangle, as seen in FIG. 16D. The foregoing figures show superimposed on the respective polygonal cross-sectional shapes respective circular cross-sections 1470 having a surface area equivalent to the surface area of the corresponding polygonal cross-sectional shape. Non-limiting conic cross-sectional shapes may comprise any curve obtained as the intersection of the surface of a cone with a plane. Different types of cross-sectional shapes 1480 are an ellipse (FIG. 16E), parabola and circle (FIG. 16F) and hyperbola (FIG. 16G). Accordingly, the semicircle, seen in FIG. 16D, is one example of a conic cross-section shape 1480.

Figure 17A:
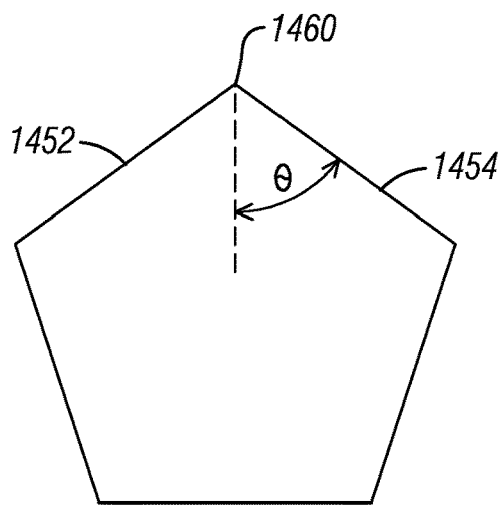
FIG. 17 shows respective examples of non-limiting overhang angles that may be used for additively manufacturing pockets and/or conduits that may be fabricated in disclosed acoustic attenuators.
Figure 17B:
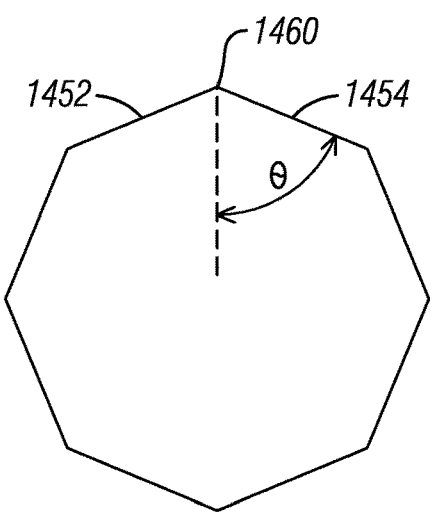

It will be appreciated that at least a segment of a periphery of the foregoing cross-sectional shapes (e.g., respective cross-sectional shapes of a given pocket and/or a given conduit) may involve two sides 1452, 1454 arranged to join at a common end point to form a respective apex 1460 of the given pocket and/or the given conduit. That is, the two sides 1452, 1454 join at a point located at the top-most portion of the given pocket and/or the given conduit. This feature allows for the pocket to be printed without any support. That is, printed as self-supporting layers. An overhang angle effective to support self-supporting layers, without limitation, may be less than an angular value in a range from about 45 degrees to about 70 degrees. Larger overhang angles may be achieved by fine tuning the printing profiles. FIG. 17 shows respective overhang angles for two non-limiting cross-sectional shapes: a hexagonal cross-sectional shape (FIG. 17A), and an octagonal cross-sectional shape (FIG. 17B).

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

In one non-limiting embodiment, a disclosed acoustic attenuator may comprise a unitized acoustic attenuator. The term "unitized" in the context of this application, unless otherwise stated, refers to a structure which is formed as a single piece (e.g., monolithic construction) using a rapid manufacturing technology, such as without limitation, 3D Printing/Additive Manufacturing (AM) technologies, where the unitized structure, singly or in combination with other unitized structures, can form a component of turbomachinery, such as for example respective acoustic attenuator assemblies, or an entire acoustic attenuator including such assemblies.

Figure 1:
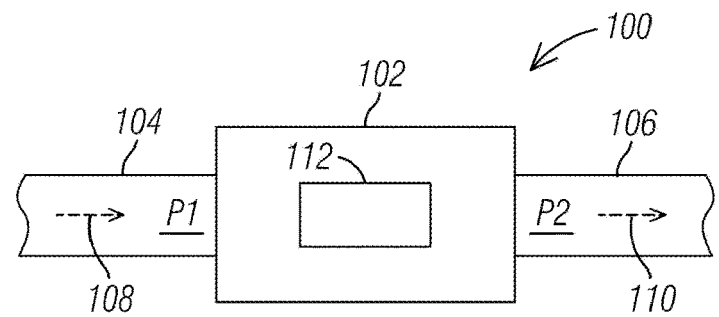
FIG. 1 is a block diagram representation of one non-limiting turbomachinery arrangement that can benefit from disclosed embodiments of acoustic attenuators that may be fabricated via additive manufacturing, according to one or more embodiments of disclosed methodology.

FIG. 1 is a block diagram representation of non-limiting turbomachinery arrangement 100 including a turbomachine 102 and conduit sections 104 and 106. The turbomachine 102 may be positioned between and coupled to conduit sections 104 and 106. The turbomachinery arrangement 100 may be part of an industrial process system (e.g., electrical power plant) or subsystem thereof. Accordingly, the conduit section 104 may be disposed upstream of the turbomachine 102 and may be in fluid communication with an upstream process component or process fluid source (not shown) of the industrial process system or subsystem thereof. Correspondingly, the conduit section 106 may be disposed downstream from the turbomachine 102 and may be in fluid communication with a downstream process component, storage component, or end use component (not shown) of the industrial process system or subsystem thereof.

The turbomachine 102 may be a fluid pressurization device or a fluid expansion device. Accordingly, examples of turbomachines 102 contemplated in the present disclosure may include, but are not limited to, gas turbines, steam turbines, expanders, compressors, and pumps. Accordingly, in embodiments in which the turbomachine 102 may be a fluid expansion device, the turbomachine 102 may receive a process fluid at a pressure P1 via the conduit section 104, and then expand the process fluid, so that the process fluid exits the turbomachine 102 and enters the conduit section 106 at a pressure P2, which is less than the pressure P1. Arrows 108 and 110 indicate the direction of this process fluid flow from the conduit section 104, through the turbomachine 102, and into the conduit section 106. Conversely, in embodiments in which the turbomachine 102 may be a fluid pressurization device, the turbomachine 102 may receive a process fluid at a pressure P1 via the conduit section 104, and then pressurize the process fluid, so that the process fluid exits the turbomachine 102 and enters the conduit section 106 at a pressure P2, which is greater than the pressure P1.

During either operation of the turbomachine 102 as disclosed above, the turbomachine 102 may be a noise source, generating acoustic energy, or noise, and producing a noise level. Accordingly, in one or more embodiments, disclosed acoustic attenuators 112 may be formed in and/or coupled to the turbomachine 102 and/or one or more components thereof. As elaborated in greater detail below, disclosed acoustic attenuators 112 may be fabricated by way of additive manufacturing. The acoustic attenuator(s) 112 attenuate the acoustic energy generated by the operation of the turbomachine 102, thereby reducing the noise level produced by the turbomachine 102. In several exemplary embodiments, the attenuation of the acoustic energy by the acoustic attenuator(s) 112 reduces the risk of any structural failure due to vibrations and/or other types of dynamic and/or vibratory loading, within and/or relatively proximate the turbomachine 102 and/or the conduit sections 104 and 106. Moreover, the attenuation of acoustic energy by the acoustic attenuator(s) 112 reduces the risk that one or more of the turbomachine 102, the conduit section 104, and the conduit section 106 will become a noise nuisance during the operation of the turbomachine 102.

Figure 2A:
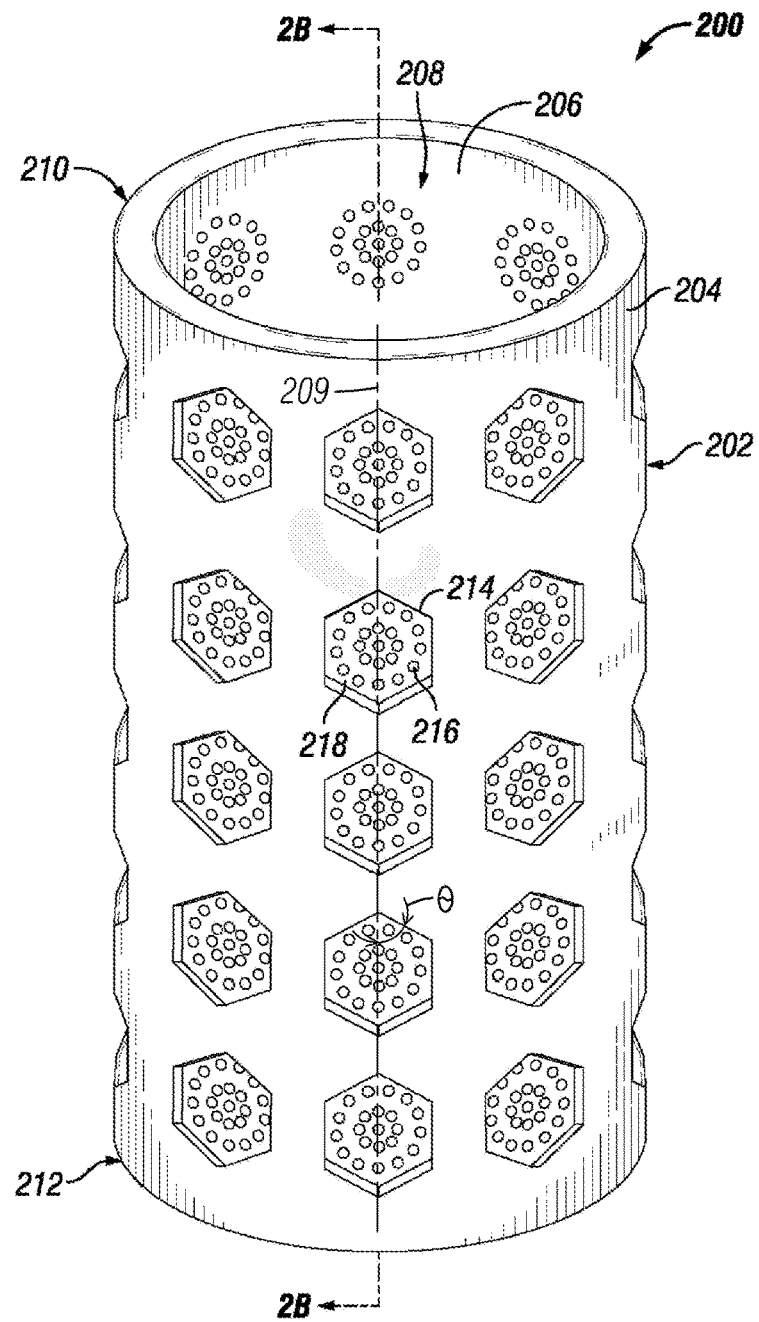
FIG. 2A is an isometric view of a disclosed acoustic attenuator.
Figure 2B:
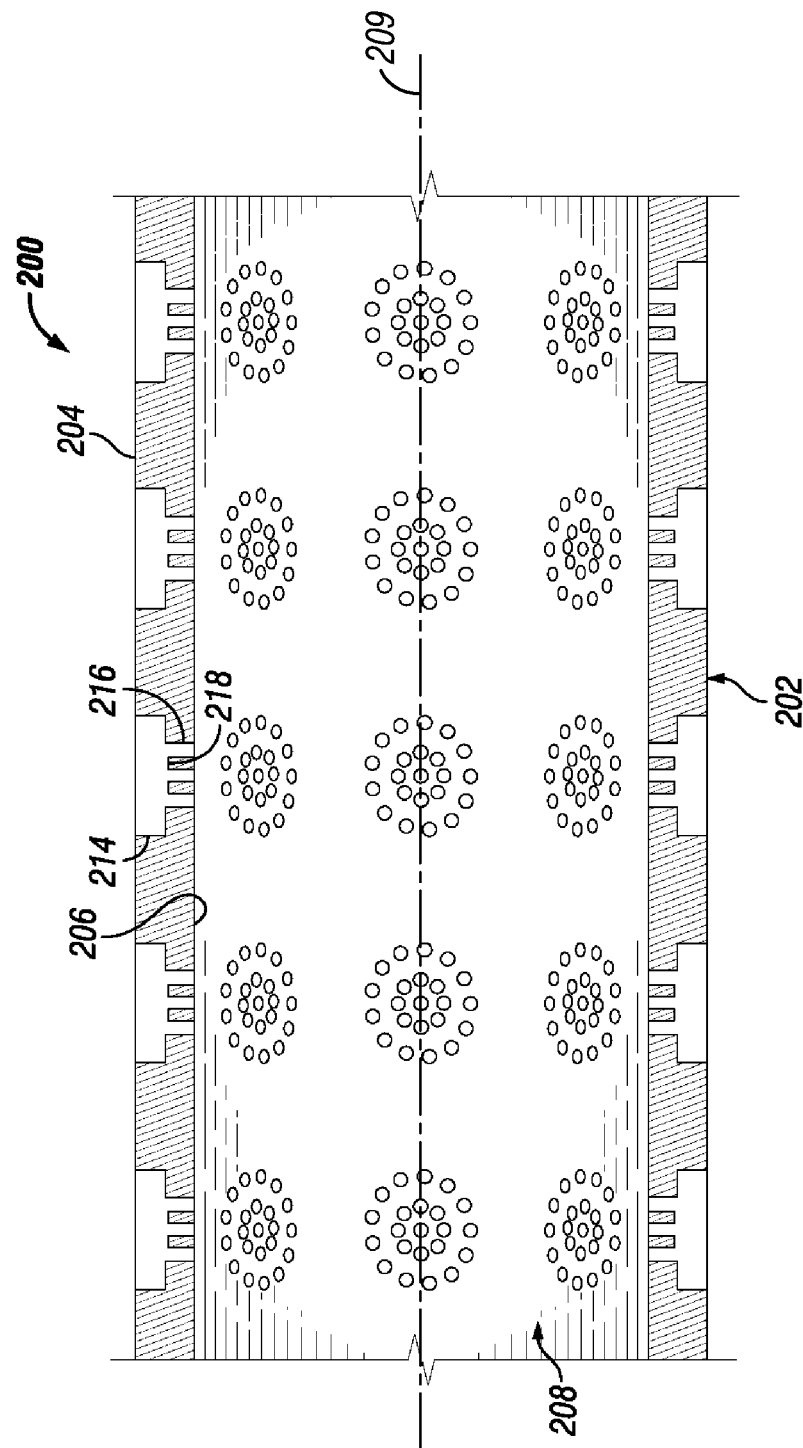
FIG. 2B is a cross-sectional view of the acoustic attenuator taken along line 2B-2B of FIG. 2A.

FIGS. 2A and 2B are respective isometric and cross-sectional views of a disclosed acoustic attenuator 200 that, as noted above, may be fabricated via additive manufacturing, according to one or more embodiments.

Additive manufacturing, or three-dimensional (3D) printing, is a process of fabricating a 3D object or article (e.g., the acoustic attenuator 200) from a digital design or model of the 3D article. As further described herein, 3D printing may include separating or slicing the digital model of the acoustic attenuator 200 into multiple layers, and generating a tool path for each of the multiple layers. An additive manufacturing device or system (e.g., 3D printer) may utilize the tool path of each of the multiple layers and a feedstock (e.g., powdered materials) to fabricate the acoustic attenuator 200 in a layer-by-layer manner, such as axially-successive cross-sectional layers. For readers desirous of general background information in connection with 3D Printing/Additive Manufacturing (AM) technologies, see, for example, a textbook titled "Additive Manufacturing Technologies, 3D Printing, Rapid Prototyping, and Direct Digital Manufacturing", by Gibson I., Stucker B., and Rosen D., 2010, published by Springer, and this textbook is incorporated herein by reference.

Without limitation, in embodiments in which the turbomachine 102 shown in FIG. 1 is a fluid pressurization device such as a centrifugal compressor, the dominant noise source is typically generated at the locations of the impeller exit and the diffuser inlet, due to the high velocity of the process fluid passing through these regions. In addition, noise may be generated at the inlet of the centrifugal compressor. Accordingly, in one or more embodiments, the acoustic attenuator 200 may, without limitation, be disposed in the inlet (not shown) and/or the diffuser (not shown) of the compressor. As arranged, the acoustic attenuator 200 may attenuate the acoustic energy generated by the turbomachine 102, thereby reducing the noise level produced by the turbomachine 102.

In other non-limiting embodiments in which the turbomachine 102 is a fluid expansion device, such as a steam turbine, acoustic energy may be generated in response to one or more of the following: the entrance of the steam into the steam turbine from the conduit section 104; the flow of the steam over the respective leading edges of the rotor blades (not shown); the flow of the steam through the respective flow regions defined between adjacent pairs of the stationary blades (not shown) of the stationary diaphragm (not shown); the flow of the steam over the respective trailing edges of the rotor blades; the impartation of angular momentum of the flowing steam to the rotor blades; the exit of the steam from the steam turbine and its entrance into the conduit section 106; and/or any combination thereof. Accordingly, in one or more embodiments, the acoustic attenuator 200 may, without limitation, be disposed in one or more of the following locations: the stationary diaphragm, the inlet of the steam turbine fluidly coupled to the conduit 104, and the outlet of the steam turbine fluidly coupled to the conduit 106. As arranged, the acoustic attenuator 200 may attenuate the acoustic energy generated by the turbomachine 102, thereby reducing the noise level produced by the turbomachine 102.

As shown in FIGS. 2A and 2B, the acoustic attenuator 200 may include a generally annular body 202 (e.g., a cylindrical body) having an outer surface 204 and an inner surface 206. The inner surface 206 may define a bore 208 extending along a longitudinal axis 209 of the acoustic attenuator between a first end and a second end of the acoustic attenuator between opposing first and second axial end portions 210, 212 of the annular body 202. The bore 208 may be configured to allow process fluid to flow therethrough. The annular body 202 may define a plurality of pockets 214, or cells, at least partially extending from the outer surface 204 of the annular body 202 toward the inner surface 206 of the annular body 202.

In at least one embodiment, the plurality of pockets 214 may be randomly disposed along the outer surface 204 of the annular body 202. In another embodiment, the plurality of pockets 214 may be arranged in an ordered pattern along the outer surface 204 of the annular body 202. For example, as illustrated in FIG. 2A, the plurality of pockets 214 may be arranged as one or more rows extending annularly along the outer surface 204 of the annular body 202. As further illustrated in FIG. 2A, a plurality of pockets 214 in one of the rows may be aligned with respect to a plurality of pockets 214 in an adjacent row. In other embodiments, a plurality of pockets 214 in one of the rows may be staggered or offset with respect to a plurality of pockets 214 in an adjacent row.

As shown most clearly in FIG. 2B, the annular body 202 of the acoustic attenuator 200 may define a set of conduits 216, or holes, extending from an inner end surface 218 of each of the pockets 214 to the inner surface 206 of the annular body 202. One or more of the conduits 216 may be associated with each of the pockets 214. In at least one embodiment, the set of conduits 216 may be randomly disposed along the inner end surface 218 of each of the pockets 214. In another embodiment, the set of conduits 216 may be disposed as an ordered pattern along the inner end surface 218 of each of the pockets 214.

While FIG. 2A illustrates the pockets 214 as having a hexagonal cross-section, as described above, the shapes of the pockets 214 may vary to include any shape having at least one overhang angle θ less than the maximum capability of the additive manufacturing device. Non-limiting illustrative shapes having such overhang angles may include, but are not limited to, pentagons, hexagons, octagons, tear-drop cross-sections, etc. In one or more embodiments, each pocket 214 may have the same cross-sectional shape as the other pockets 214 in the annular body 202. In another embodiment, one or more pockets 214 may have different cross-sectional shapes than the remainder of the pockets 214 in the annular body 202.

Additionally, while FIG. 2A illustrates the conduits 216 as each having a circular cross-section, as noted above, the shapes of the conduits 216 may be any shape having at least one overhang angle θ less than the maximum capability of the additive manufacturing device. Non-limiting illustrative shapes having such overhang angles may include, but are not limited to, pentagons, hexagons, octagons, tear-shaped cross-sections, etc. In one or more embodiments, each conduit may have the same cross-sectional shape as the other conduits 216 in the annular body 202. In another embodiment, one or more conduits 216 may have different cross-sectional shapes than the remainder of the conduits 216 in the annular body 202.

Figure 3A:
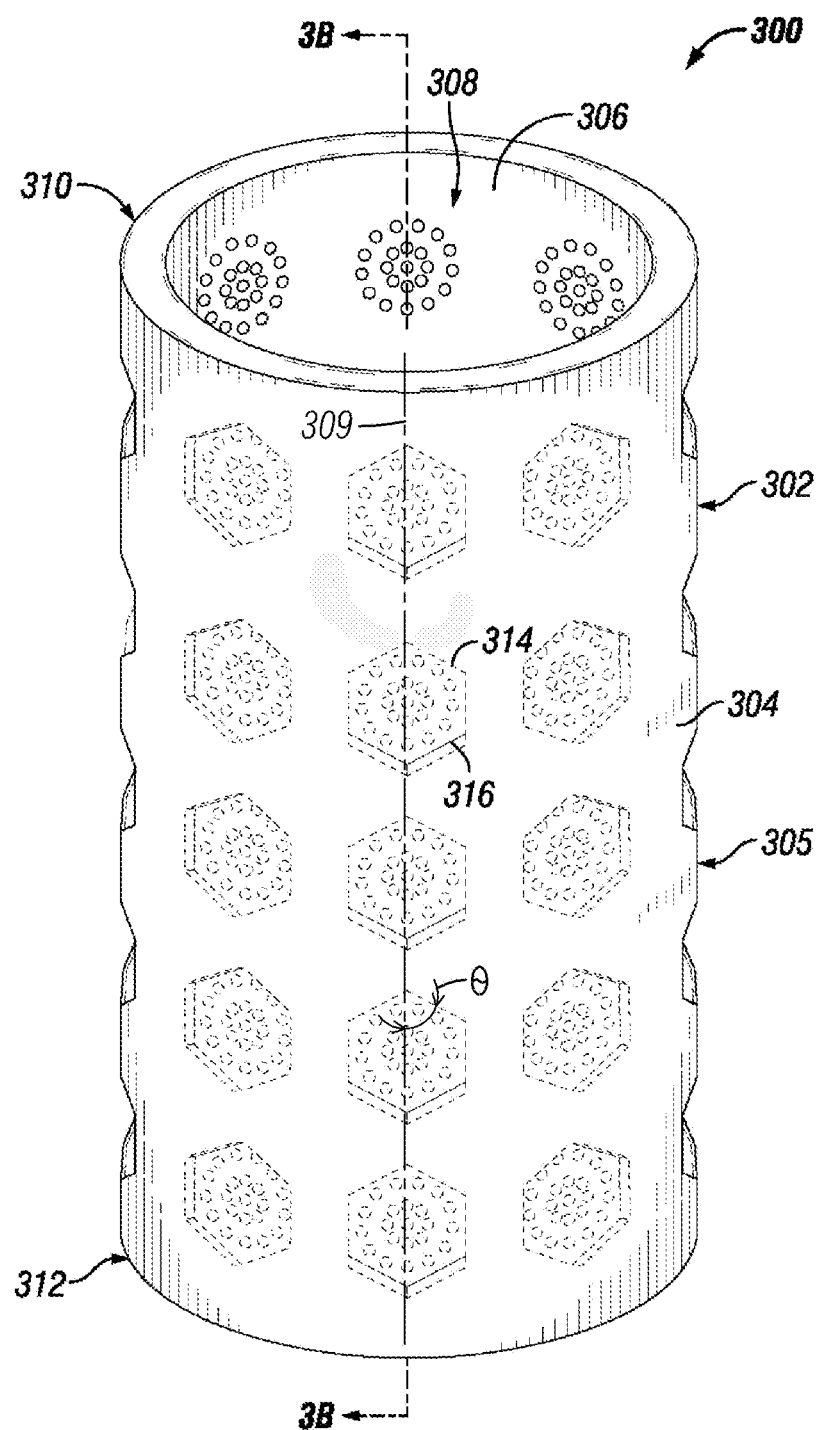
FIG. 3A is an isometric view of another disclosed acoustic attenuator.
Figure 3B:
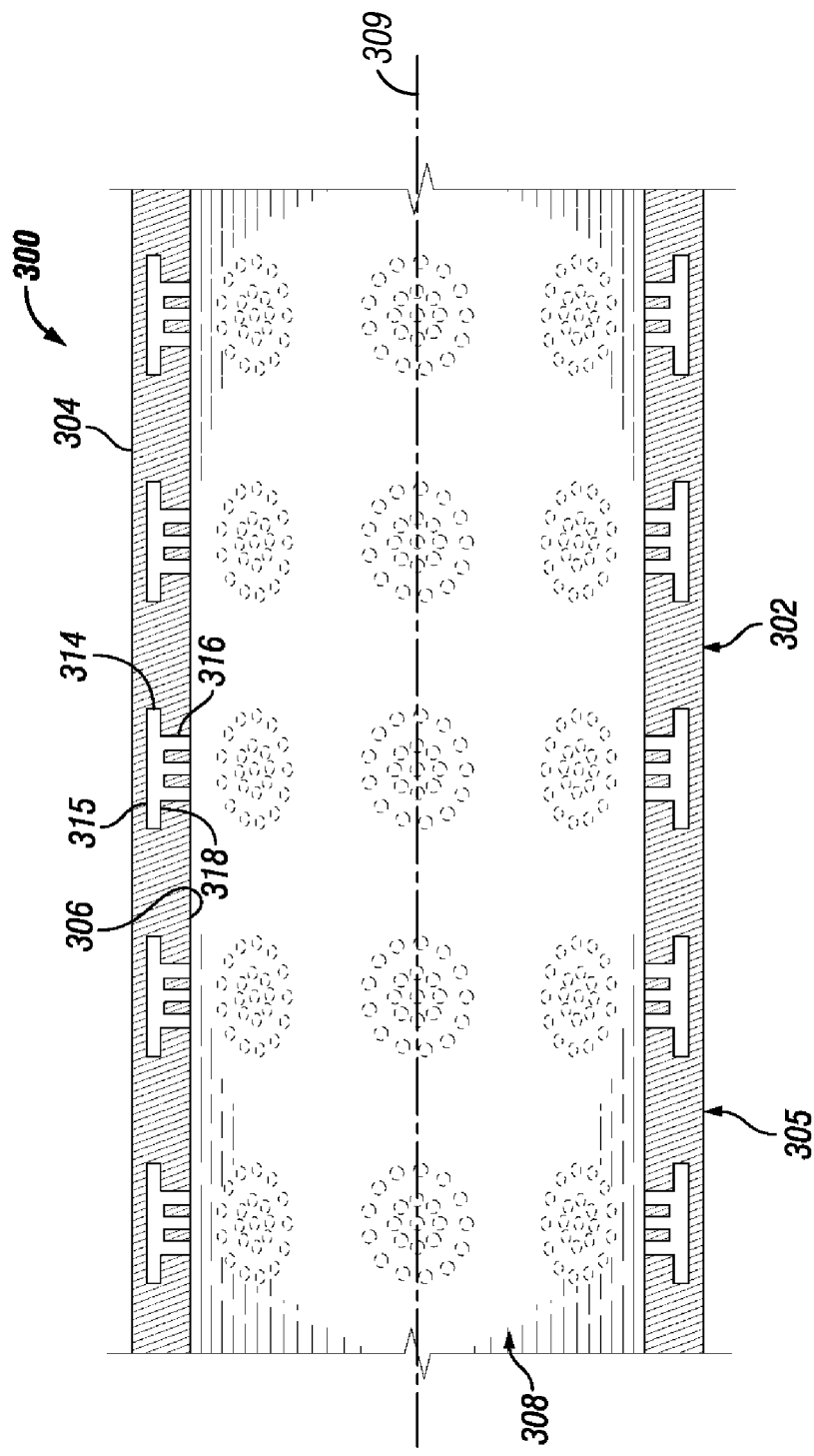
FIG. 3B is a cross-sectional view of the acoustic attenuator taken along line 3B-3B of FIG. 3A.

FIGS. 3A and 3B illustrate respective isometric and cross-sectional views of an exemplary acoustic attenuator 300 that may be fabricated via additive manufacturing, according to one or more embodiments. As shown in FIGS. 3A and 3B, the acoustic attenuator 300 may have a generally annular body 302 having an outer surface 304 forming in part an integral cover 305, and an inner surface 306. The inner surface 306 may define a bore 308 extending between opposing first and second axial end portions 310, 312 of the annular body 302. The bore 308 may be configured to allow process fluid to flow therethrough. The outer surface 304 of the annular body 302 may be closed (e.g., solid surface), thereby forming part (i.e., the radially outer surface) of the integral cover 305 or liner. Accordingly, in one or more embodiments, the acoustic attenuator 300 may replace a section of the turbomachine 102, the conduit 104, or the conduit 106 traditionally utilized as the cover provided to substantially enclose the pockets of the acoustic liner.

As seen most clearly in FIG. 3B, the annular body 302 may define a plurality of pockets 314, or cells (shown in phantom in FIG. 3A), at least partially extending from a radially inner surface 315 of the integral cover 305 of the annular body 302 toward the inner surface 306 of the annular body 302. In at least one embodiment, the plurality of pockets 314 may be randomly disposed within the annular body 302. In another embodiment, the plurality of pockets 314 may be arranged in an ordered pattern within the annular body 302. For example, as illustrated in FIG. 3A, the pockets 314 may be arranged as one or more rows extending annularly along the radially inner surface 315 of the integral cover 305 of the annular body 302. As further illustrated in FIG. 3B, the pockets 314 in one of the rows may be aligned with respect to a plurality of pockets 314 in an adjacent row. In other embodiments, a plurality of pockets 314 in one of the rows may be staggered or offset with respect to a plurality of pockets 314 in an adjacent row.

As shown most clearly in FIG. 3B, the annular body 302 of the acoustic attenuator 300 may define a set of conduits 316, or holes, extending from an inner end surface 318 of each of the pockets 314 to the inner surface 306 of the annular body 302. One or more of the conduits 316 may be associated with each of the pockets 314. In at least one embodiment, the set of conduits 316 may be randomly disposed along the inner end surface 318 of each of the pockets 314. In another embodiment, the set of conduits 316 may be disposed as an ordered pattern along the inner end surface 318 of each of the pockets 314.

While FIG. 3A illustrates the pockets 314 as having a hexagonal cross-section, as described above, the pockets 314 may vary to include any shape having at least one overhang angle θ less than the maximum capability of the additive manufacturing device. In one or more embodiments, each pocket 314 may have the same cross-section shape as the other pockets 314 in the annular body 302. In another embodiment, one or more pockets 314 may have different cross-section shapes than the remainder of the pockets 314 in the annular body 302.

Additionally, while FIG. 3A illustrates the conduits 316 as each having a circular cross-section, it may be appreciated that the shapes of the conduits 316 may be polygonal. In one or more embodiments, the shapes of the conduits 316 may vary to include any shape having at least one overhang angle less than the maximum capability of the additive manufacturing device. In one or more embodiments, each conduit 316 may have the same cross-sectional shape as the other conduits 316 in the annular body 302. In another embodiment, one or more conduits 316 may have different cross-sectional shapes than the remainder of the conduits 316 in the annular body 302.

Figure 4A:
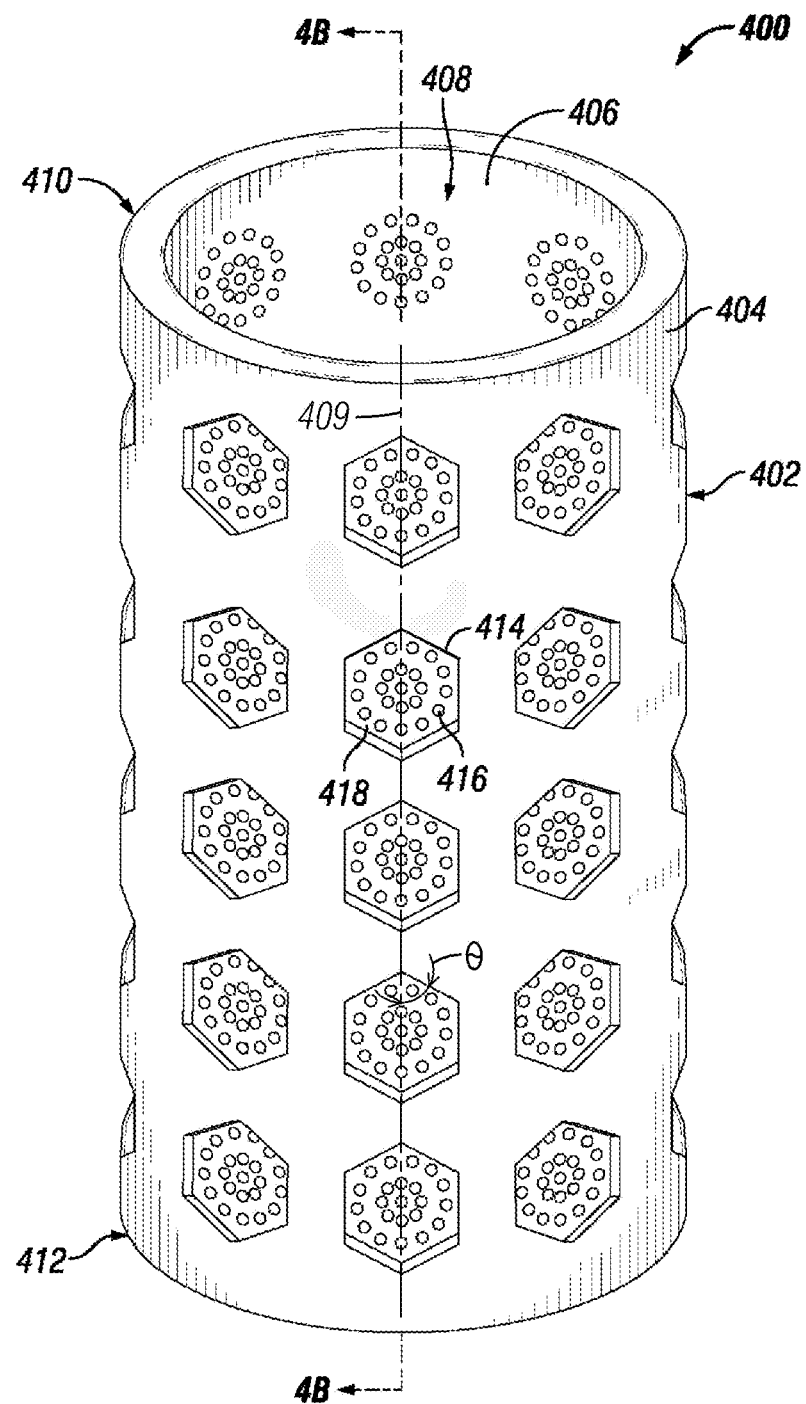
FIG. 4A is an isometric view of yet another disclosed acoustic attenuator that may be fabricated via additive manufacturing, according to one or more embodiments disclosed.
Figure 4B:
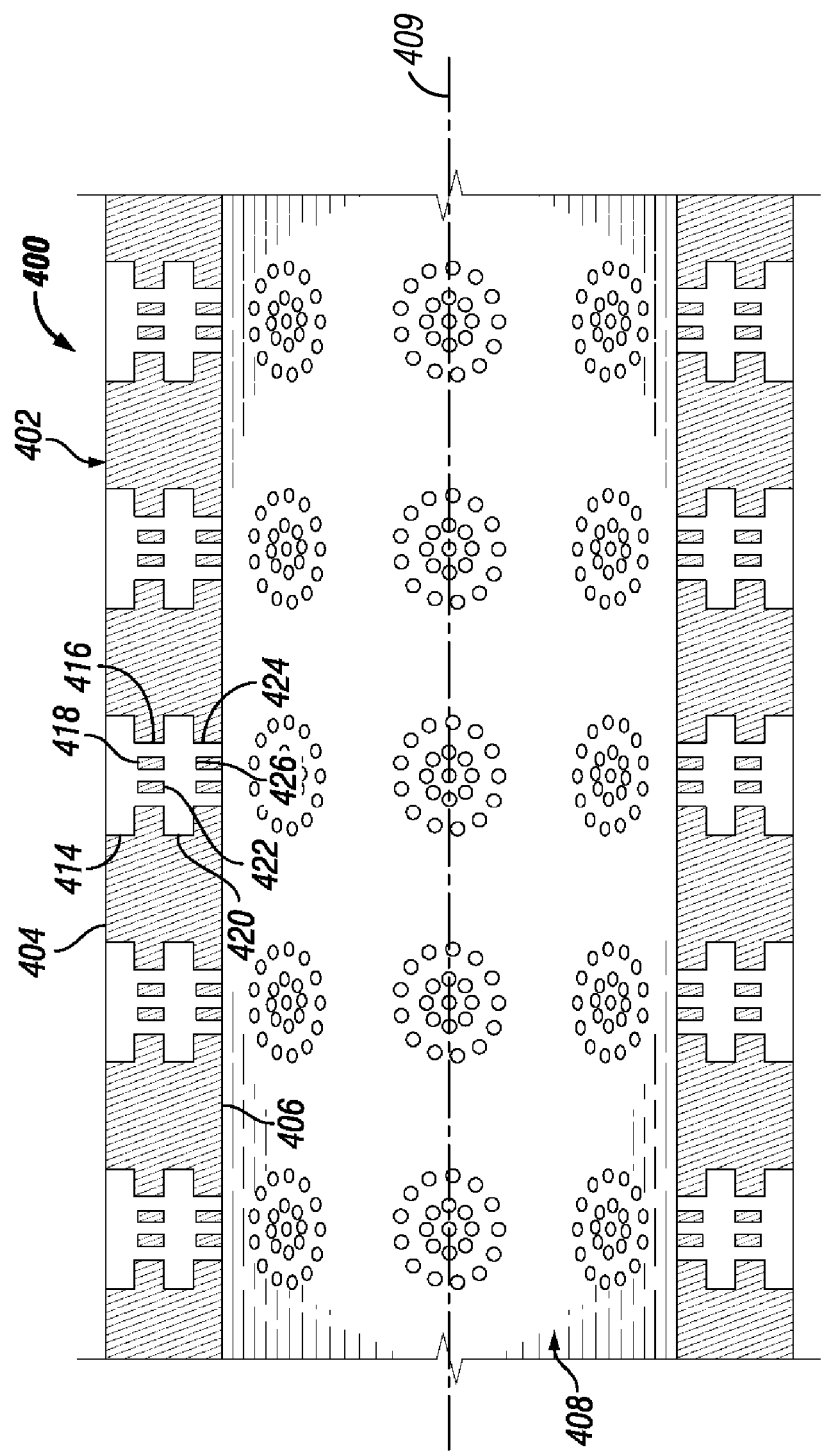
FIG. 4B is a cross-sectional view of the acoustic attenuator taken along line 4B-4B of FIG. 4A.

FIGS. 4A and 4B illustrate respective isometric and cross-sectional views of an exemplary acoustic attenuator 400 that may be fabricated via additive manufacturing, according to one or more embodiments. As shown in FIGS. 4A and 4B, the acoustic attenuator 400 may include an annular body 402 having an outer surface 404 and an inner surface 406. The inner surface 406 may define a bore 408 extending between opposing first and second axial end portions 410, 412 of the annular body 402. The bore 408 may be configured to allow process fluid to flow therethrough. The annular body 402 may define a first plurality of pockets 414, or cells, at least partially extending from the outer surface 404 of the annular body 402 toward the inner surface 406 of the annular body 402.

The annular body 402 of the acoustic attenuator 400 may define a first set of conduits 416, or holes, extending from an inner end surface 418 of each of the pockets 414 toward the inner surface 406 of the annular body 402. One or more of the conduits 416 may be associated with each of the pockets 414. In at least one embodiment, the set of conduits 416 may be randomly disposed along the inner end surface 418 of each of the pockets 414. In another embodiment, the set of conduits 416 may be disposed as an ordered pattern along the inner end surface 418 of each of the pockets 414.

As seen most clearly in FIG. 4B, the annular body 402 may define a second plurality of pockets 420, or cells, at least partially extending from an inner end surface 422 of each of the conduits 416 toward the inner surface 406 of the annular body 402. It will be appreciated that each pocket 420 constitutes a radially-inward pocket relative to a corresponding pocket 414. The annular body 402 of the acoustic attenuator 400 may define a second set of conduits 424, or holes, extending from an inner end surface 426 of each of the pockets 420 to the inner surface 406 of the annular body 402. One or more of the conduits 424 may be associated with each of the pockets 420. In at least one embodiment, the second set of conduits 424 may be randomly disposed along the inner end surface 426 of each of the pockets 420. In another embodiment, the second set of conduits 424 may be disposed as an ordered pattern along the inner end surface 426 of each of the pockets 420.

The second plurality of pockets 420 may be substantially aligned with the first plurality of pockets 414. In at least one embodiment, the aligned pockets 414 and 420 and the corresponding conduits 416 and 424 are disposed in a nested relationship. As arranged, the acoustic attenuator 400 may attenuate the sound waves over a broader range of frequencies as compared to the embodiments described with reference to FIGS. 2A, 2B, 3A, and 3B.

While FIG. 4A illustrates the pockets 414 and 420 as having a hexagonal cross-section, as noted above, the shapes of the pockets 414 and 420 may vary to include any shape having at least one overhang angle θ less than the maximum capability of the additive manufacturing device. Non-limiting illustrative shapes having such overhang angles may include, but are not limited to, pentagons, hexagons, octagons, and tear-shaped cross-sections, etc. In one or more embodiments, each aligned pocket grouping 414 and 420 may have the same cross-section shape as the other aligned pocket groupings 414 and 420 in the annular body 402. In another embodiment, one or more aligned pocket groupings 414 and 420 may have different cross-section shapes than the remainder of the aligned pocket groupings 414 and 420 in the annular body 402.

Additionally, while the conduits 416 and 424 are illustrated as each having a circular cross-section, it may be appreciated that the shapes of the conduits 416 and 424 may be any shape having at least one overhang angle less than the maximum capability of the additive manufacturing device. In one or more embodiments, each conduit grouping 416 and 424 may have the same cross-section shape as other conduits groupings 416 and 424 in the annular body 402. In another embodiment, one or more conduits groupings 416 and 424 may have different cross-section shapes than the remainder of conduit groupings 416 and 424 in the annular body 402.

Figure 5A:
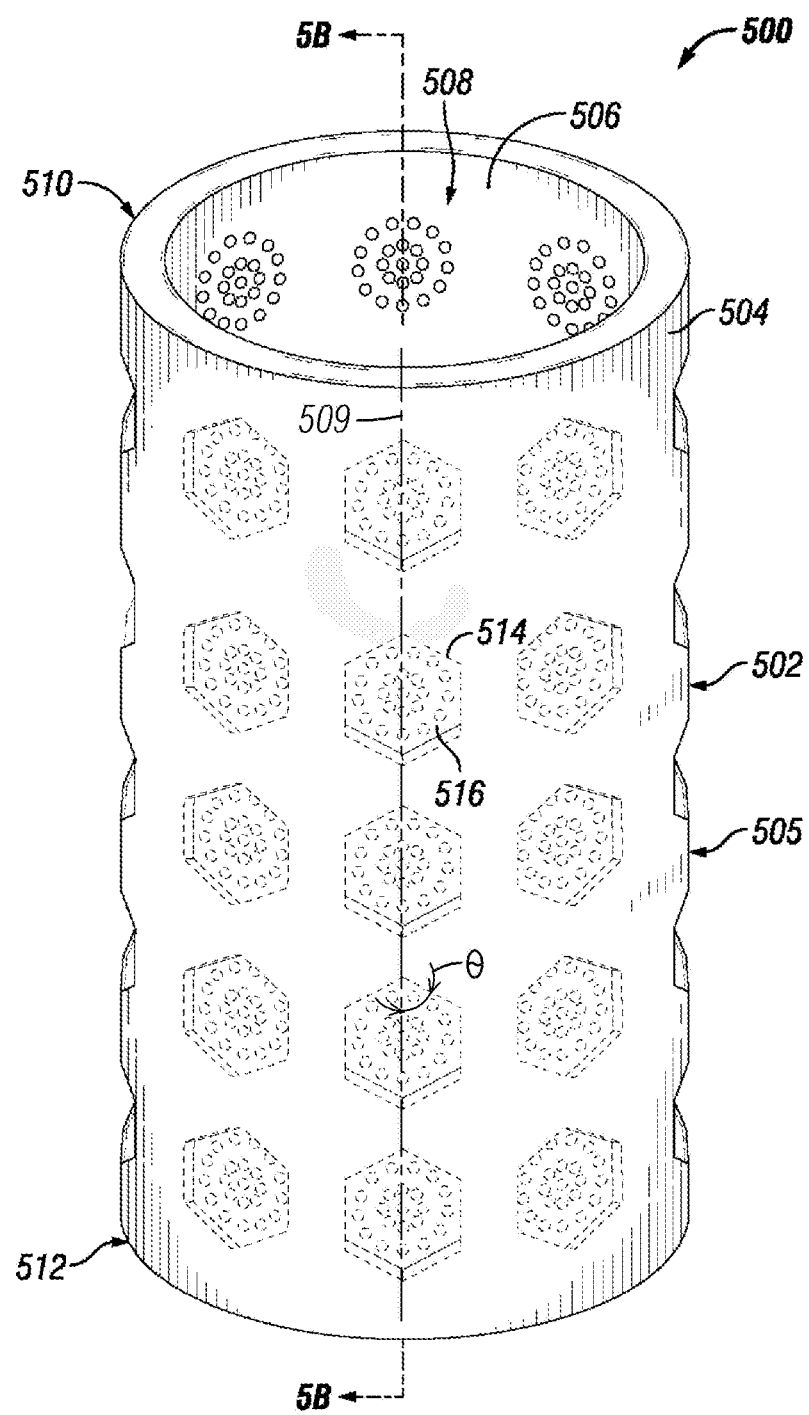
FIG. 5A is an isometric view of still another disclosed acoustic attenuator.
Figure 5B:
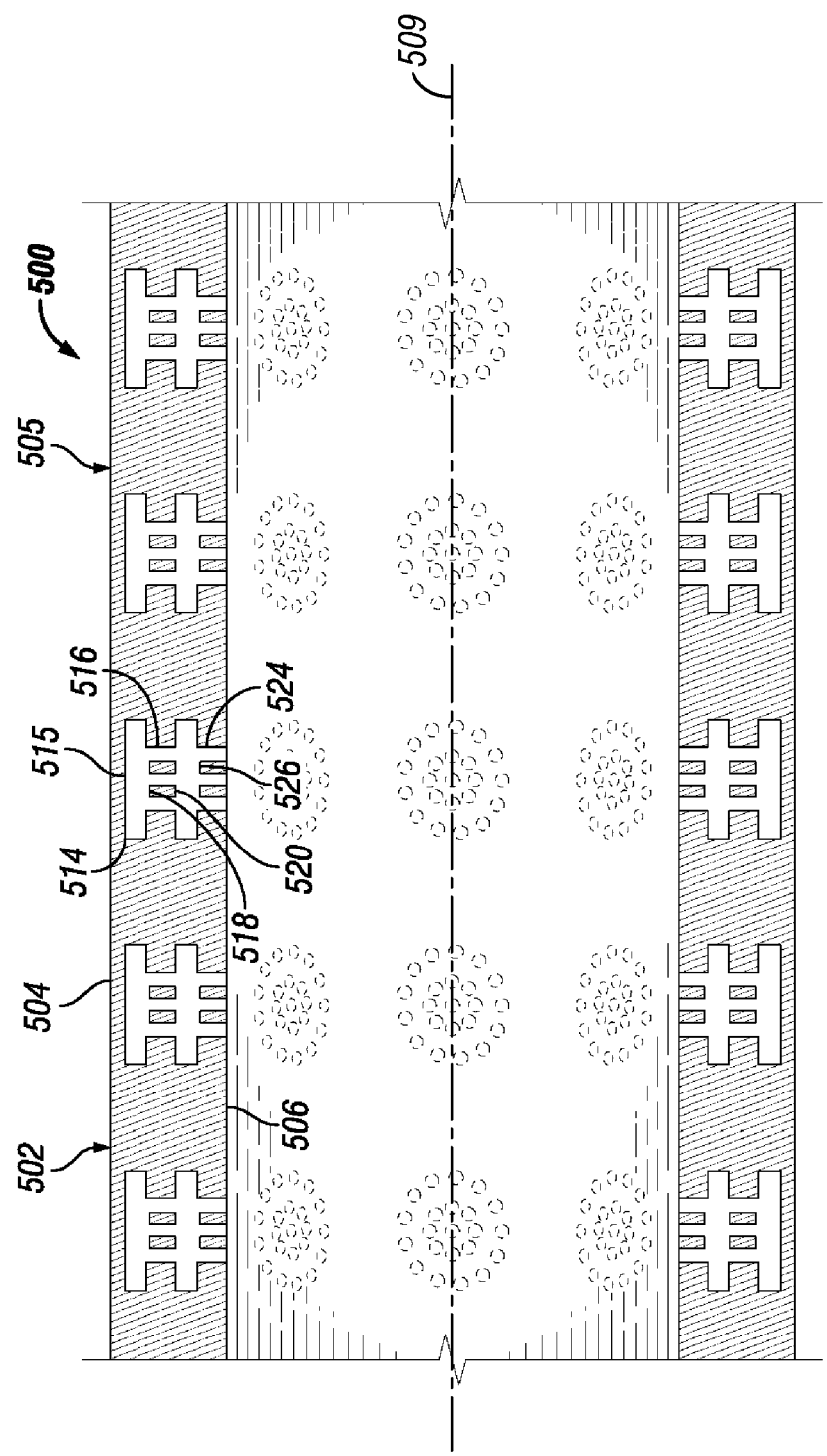
FIG. 5B is a cross-sectional view of the acoustic attenuator taken along line 5B-5B of FIG. 5A, according to one or more embodiments disclosed.

FIGS. 5A and 5B illustrate respective isometric and cross-sectional views of an exemplary acoustic attenuator 500 that may be fabricated via additive manufacturing, according to one or more embodiments. As shown in FIGS. 5A and 5B, the acoustic attenuator 500 may have a generally annular body 502 having an outer surface 504 forming in part an integral cover 505, and an inner surface 506. The inner surface 506 may define a bore 508 extending between opposing first and second axial end portions 510, 512 of the annular body 502. The bore 508 may be configured to allow process fluid to flow therethrough. The outer surface 504 of the annular body 502 may be closed (e.g., solid surface), thereby forming part (i.e., the radially outer surface) of the integral cover 505 or liner.

The annular body 502 may define a first plurality of pockets 514, or cells (shown in phantom in FIG. 5A), at least partially extending from a radially inner surface 515 of the integral cover 505 of the annular body 502 toward the inner surface 506 of the annular body 302. As shown most clearly in FIG. 5B, the annular body 502 of the acoustic attenuator 500 may define a first set of conduits 516, or holes, extending from an inner end surface 518 of each of the pockets 514 toward the inner surface 506 of the annular body 502. Respective conduits 516 may be associated with respective pockets 514. In at least one embodiment, the set of conduits 516 may be randomly disposed along the inner end surface 518 of each of the pockets 514. In another embodiment, the set of conduits 516 may be disposed as an ordered pattern along the inner end surface 518 of each of the pockets 514.

The annular body 502 may define a second plurality of pockets 520, or cells, at least partially extending from an inner end surface 522 of each of the conduits 516 toward the inner surface 506 of the annular body 502. The annular body 502 of the acoustic attenuator 500 may define a second set of conduits 524, or holes, extending from an inner end surface 526 of each of the pockets 520 to the inner surface 506 of the annular body 502. One or more of the conduits 524 may be associated with each of the pockets 520. In at least one embodiment, the set of conduits 524 may be randomly disposed along the inner end surface 526 of each of the pockets 520. In another embodiment, the set of conduits 524 may be disposed as an ordered pattern along the inner end surface 526 of each of the pockets 520.

The second plurality of pockets 520 may be substantially aligned with the first plurality of pockets 514. In at least one embodiment, the aligned pockets 514 and 520 and the corresponding conduits 516 and 524 are disposed in a nested relationship. As arranged, the acoustic attenuator 500 may attenuate the sound waves over a broader range of frequencies as compared to the embodiments described with reference to FIGS. 2A, 2B, 3A, and 3B.

While FIG. 5A illustrates the pockets 514 and 520 as having a hexagonal cross-section, as noted above, the shapes of the pockets 514 and 520 may vary to include any shape having at least one overhang angle $\theta$ less than the maximum capability of the additive manufacturing device. In one or more embodiments, each pocket grouping 514 and 520 may have the same cross-section shape as the other pocket groupings 514 and 520 in the annular body 502. In another embodiment, one or more pocket groupings 514 and 520 may have different cross-section shapes than the remainder of the pocket groupings 514 and 520 in the annular body 502.

Additionally, while the conduits 516 and 524 are illustrated as each having a circular cross-section, it may be appreciated that the shapes of the conduits 516 and 524 may vary to include any shape having at least one overhang angle less than the maximum capability of the additive manufacturing device. In one or more embodiments, each conduit grouping 516 and 524 may have the same cross-section shape as the other conduit groupings 516 and 524 in the annular body 502. In another embodiment, one or more conduit groupings 516 and 524 may have different cross-section shapes than the remainder of the conduit groupings 516 and 524 in the annular body 502.

Each of the acoustic attenuators 200, 300, 400, 500 described above may be fabricated as a single or monolithic piece (unitized structure) via 3D printing. Accordingly, the acoustic attenuators 200, 300, 400, 500 may be formed without any welding, brazing, or mechanical fasteners (e.g., screws, bolts, nuts, clamps, etc.). It should be appreciated that omitting the welding, brazing, or mechanical fasteners may reduce installation and maintenance of the acoustic attenuators 200, 300, 400, 500. It should further be appreciated that fabricating the acoustic attenuators 200, 300, 400, 500 via 3D printing may reduce manufacturing lead times by eliminating one or more assembly processes. Each of the acoustic attenuators 200, 300, 400, 500 described above may be formed from one or more metals, one or more metalloids, one or more non-metals, one or more additives, or any combination or compounds thereof.

The metals may be or include, but are not limited to, one or more alkali metals, one or more alkaline earth metals, one or more transition metals, one or more post-transition metals, or any mixtures, alloys, or compounds thereof. Illustrative transition metals may include, but are not limited to, chromium, iron, cobalt, molybdenum, tungsten, tantalum, titanium, zirconium, niobium, rhenium, yttrium, vanadium, hafnium, or any mixtures, alloys, or compounds thereof. Illustrative metals may also be or include, but are not limited to, aluminum, iron, titanium, or the like, or any combination thereof. The metals may also be or include metal alloys and superalloys, such as stainless steel, carbon steel, a nickel-based superalloy, a cobalt-based superalloy, or the like, or any combination thereof. The one or more metalloids may be or include, but are not limited to, boron, silicon, antimony, or any mixtures or compounds thereof.

The non-metals may be or include, but are not limited to, carbon, sulfur, phosphorus, or the like, or any mixtures or compounds thereof. For example, the non-metals may include carbon black, graphite, carbon nanomaterials, or the like, or any combination thereof. The one or more non-metals may also be or include one or more polymers or polymeric materials. Illustrative polymers may include, but are not limited to, polyester, epoxy, polyimide, polyetheretherketone (PEEK), polypropylene, or the like, or any combination thereof.

The additives may be or include, but are not limited to, one or more lubricants. The lubricants may be configured to increase flow and/or reduce friction during the fabrication of each of the acoustic attenuators 200, 300, 400, 500. For example, the lubricants may be combined with the metals, the metalloids, and/or the non-metals and configured to reduce friction between the metals, the metalloids, and/or the non-metals during one or more fabrication processes (e.g., pressing, compaction, alloying, etc.). In another example, the lubricants may be or form a coating on the metals, the metalloids, and/or the non-metals, and the coating may be configured to reduce friction between the metals, the metalloids, and/or the non-metals during the one or more fabrication processes. Illustrative lubricants may include, but are not limited to, one or more organic compounds such as stearic acid, stearin, metallic stearates, or the like, or any combination thereof.

The additives may also be or include, but are not limited to, one or more binders. The binders may be configured to combine, couple, and/or agglomerate the metals, the metalloids, and/or the non-metals with one another. For example, the binder may be configured to facilitate the agglomeration of the metals, the metalloids, and/or the non-metals with one another to form a feedstock may be utilized in the fabrication of each of the acoustic attenuators 200, 300, 400, 500. The binders may be or include one or more metallic binders, inorganic binders, organic binders, or any combination thereof.

Illustrative metallic binders may include, but are not limited to, any one or more transition metals including, but not limited to, magnesium, ruthenium, osmium, iron, cobalt, nickel, copper, molybdenum, tantalum, tungsten, rhenium, or any mixtures, compounds, or alloys thereof. The metallic binders may also include, but are not limited to, any alkali metals including, but not limited to, lithium, sodium, potassium, rubidium, cesium, or any mixtures, compounds, or alloys thereof. Illustrative organic binders may be or include, but are not limited to, one or more waxes or resins that are insoluble, or at least substantially insoluble, in water. Waxes may include, for example, animal waxes, vegetable waxes, mineral waxes, synthetic waxes, or any combination thereof.

Figure 6:
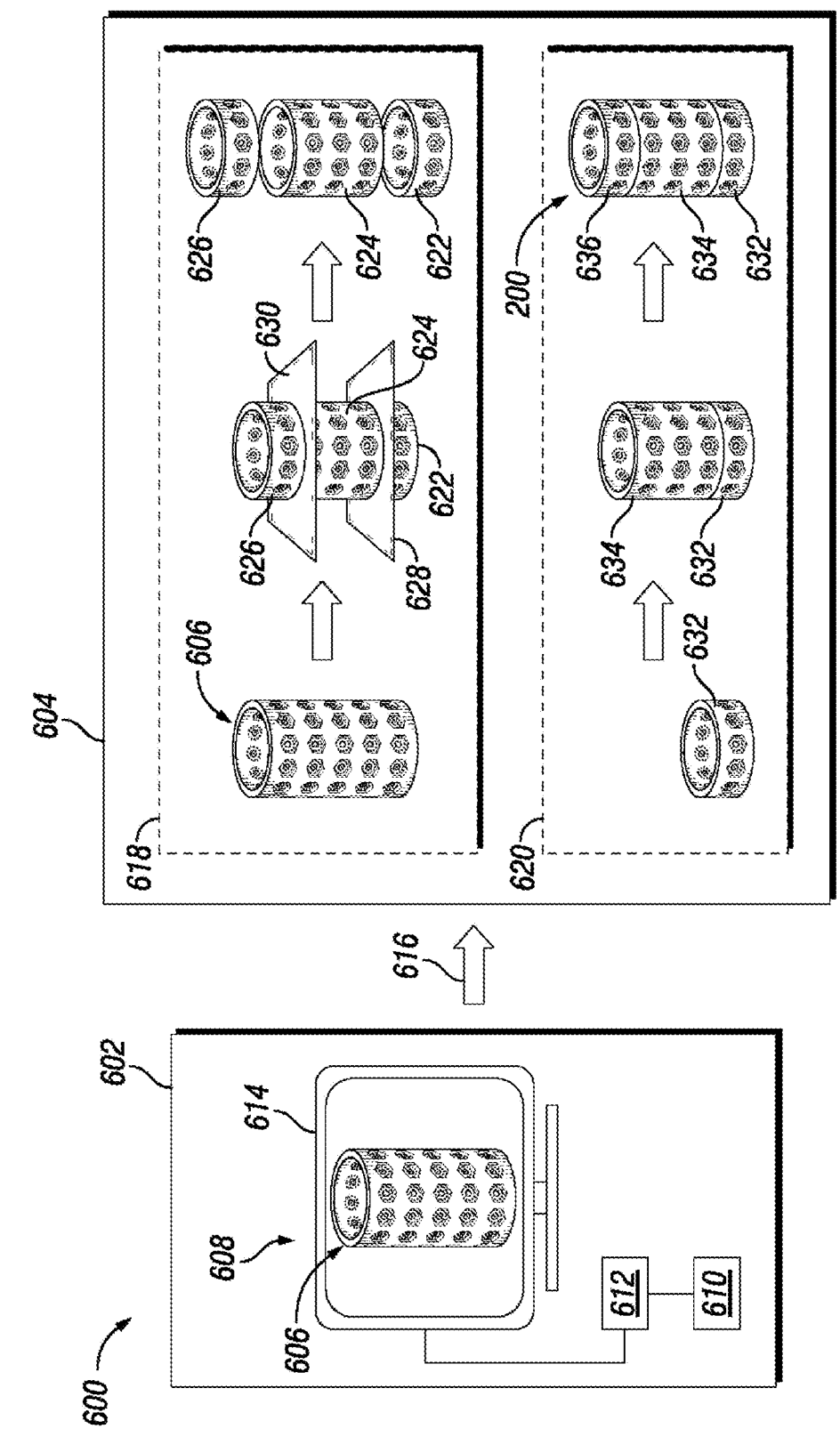
FIG. 6 is a schematic of a non-limiting system for fabricating any of the disclosed acoustic attenuators of FIGS. 2A, 2B, 3A, 3B, 4A, 4B, 5A, and 5B.

FIG. 6 illustrates a schematic of an exemplary system 600 for fabricating any of the acoustic attenuators 200, 300, 400, 500 of FIGS. 2A, 2B, 3A, 3B, 4A, 4B, 5A, and 5B via 3D printing, according to one or more embodiments disclosed. In particular, FIG. 6 illustrates the system 600 being utilized in the fabrication of the acoustic attenuator 200 of FIGS. 2A and 2B; however, in other embodiments, one or more of the acoustic attenuators 200, 300, 400, 500 may be fabricated via the system 600.

As illustrated in FIG. 6, the system 600 may include a computer aided design (CAD) assembly 602 and a layering device 604. The CAD assembly 602 may include any software capable of providing or generating a geometry or digital model 606 of the acoustic attenuator 200 in three dimensions. As further described herein, the layering device 604 may utilize the digital model 606 as a template or guide to fabricate the acoustic attenuator 200 in a layer-by-layer manner. The layering device 604 may be or include any device (e.g., 3D printer) capable of fabricating the acoustic attenuator 200 using the digital model 606 as a template.

Illustrative layering devices may include, but are not limited to, PROJET® 1000, PROJET® 1500, PROJET® SD 3500, PROJET® HD 3500, PROJET® HD 3500PLUS, PROJET® 3500 HDMAX, PROJET® CP 3500, PROJET® CPX 3500, PROJET® CPX 3500PLUS, PROJET® 3500 CPXMAX, PROJET® 7000, PROJET® 6000, PROJET® 5000, PROJET® DP 3500, PROJET® MP 3500, ZPRINTER® 150, ZPRINTER® 250, ZPRINTER® 350, ZPRINTER® 450, ZPRINTER® 650, ZPRINTER® 850, ProX® 500, sPro® 140, sPro® 60 HD, sPro® 230, ProX® 100, ProX® 200, and/or ProX® 300, which are all commercially available from 3D Systems Corp. of Rock Hill, S.C. Illustrative layering devices may also include, but are not limited to, EOSINT® M 280, EOS® M 290, EOS® M 400, and/or PRECIOUS® M 080, which are all commercially available from EOS of North America, Inc. of Novi, Mich. The layering devices may further include an AM250 laser melting machine commercially available from Renishaw Inc. of Hoffman Estates, Ill.

The CAD assembly 602 may include at least one computer 608 having at least one memory 610 (e.g., hard drives, random access memory, flash memory, etc.), one or more central processing units (one is shown 612), one or more input devices (e.g., keyboard and mouse) (not shown), one or more monitors 614 on which a software application can be executed, or any combination thereof. The memory 610 may store an operating system and/or any programs or software capable of providing or generating the digital model 606. The central processing unit 612 may work in concert with the memory 610 and/or the input devices (not shown) to perform tasks for a user or operator. The central processing unit 612 may be automated or may execute commands at the direction of the user.

The computer 608 may interface with one or more databases, support computers or processors, the Internet, or any combination thereof. It may be appreciated that the term "interface" may refer to all possible internal and/or external interfaces, wired or wireless. While FIG. 6 illustrates the computer 608 as a platform on which the methods discussed and described herein may be performed, the methods may also be performed on any other platform or device having computing capabilities. For example, the layering device 604 may include a platform or device capable of generating the digital model 606.

The digital model 606 may include information or data defining one or more portions of the acoustic attenuator 200. For example, the digital model 606 may include 3D numerical coordinates of an entire geometry of the acoustic attenuator 200. The digital model 606 may define an inner surface, an outer surface, and/or a volume of the acoustic attenuator 200 to be fabricated by the layering device 604. The digital model 606 may be communicated to the layering device 604, as illustrated by arrow 616, and may provide the template to fabricate the acoustic attenuator 200.

The layering device 604 may fabricate the acoustic attenuator 200 from the digital model 606 in one or more processes (two are shown 618, 620). A first process 618 for fabricating the acoustic attenuator 200 from the digital model 606 may be or include a digital process. The digital process 618 may include dividing or partitioning the digital model 606 into two or more digital layers or digital cross-sections (three are shown 622, 624, 626) using one or more digital horizontal planes (two are shown 628, 630). For example, as illustrated in FIG. 6, the digital process 618 may include partitioning the digital model 606 into successive digital cross-sections 622, 624, 626, which may be two dimensional (2D) or 3D. It may be appreciated that the layering device 604 may divide or partition the digital model 606 into any number of digital cross-sections 622, 624, 626 using any number of digital horizontal planes 628, 630.

Each of the digital cross-sections 622, 624, 626 may provide a template to fabricate at least a portion of the acoustic attenuator 200. For example, as illustrated in FIG. 6, each of the digital cross-sections 622, 624, 626 may provide a template to fabricate a corresponding layer 632, 634, 636 of the acoustic attenuator 200 in a second process 620. The digital cross-sections 622, 624, 626 may include data defining the respective layers 632, 634, 636 of the acoustic attenuator 200. For example, a first digital cross-section 622 may include data defining a first layer 632 of the acoustic attenuator 200, a second digital cross-section 624 may include data defining a second layer 634 of the acoustic attenuator 200, and a third digital cross-section 626 may include data defining a third layer 636 of the acoustic attenuator 200.

Each of the digital cross-sections 622, 624, 626 may include data defining an outer cross-sectional line, an inner cross-sectional line, a cross-sectional area, a volume, or any combination thereof. The respective inner cross-sectional line and outer cross-sectional line of each of the digital cross-sections 622, 624, 626 may define a respective inner surface and a respective outer surface of each of the layers 632, 634, 636 of the acoustic attenuator 200. Further, the respective cross-sectional area of each of the digital cross-sections 622, 624, 626 may at least partially define a respective volume of each of the layers 632, 634, 636 of the acoustic attenuator 200.

As previously discussed, the layering device 604 may fabricate the acoustic attenuator 200 from the digital model 606 in one or more processes 618, 620, and the digital process 618 may include partitioning the digital model 606 into the digital cross-sections 622, 624, 626. The second process 620 for fabricating the acoustic attenuator 200 from the digital model 606 may include fabricating each of the layers 632, 634, 636 of the acoustic attenuator 200 in a layer-by-layer manner. For example, the second process 620 may include sequentially forming each of the layers 632, 634, 636 of the acoustic attenuator 200 using the respective digital cross-sections 622, 624, 626 as a template. The second process 620 may also include binding the layers 632, 634, 636 with one another to build or form the acoustic attenuator 200. Any number of layers 632, 634, 636 may be formed and/or bound with one another to form the acoustic attenuator 200.

In an exemplary operation, illustrated in FIG. 6, the layering device 604 may at least partially fabricate the acoustic attenuator 200 by forming the first layer 632, the second layer 634, and the third layer 636, and combining or binding the first, second, and third layers 632, 634, 636 with one another. The first layer 632 may be formed on a substrate (not shown) configured to support the first layer 632 and any subsequent layers. Any one or more of the layers 632, 634, 636 formed by the layering device 604 may provide or be a substrate for any subsequent layers deposited by the layering device 604. For example, the first layer 632 deposited by the layering device 604 may be or provide the substrate for the second layer 634 or any subsequent layers. In another example, the second layer 634 may be or provide the substrate for the third layer 636 or any subsequent layers.

In at least one embodiment, the formation of at least one of the layers 632, 634, 636 and the binding of the at least one of the layers 632, 634, 636 with another one of the layers 632, 634, 636 may occur simultaneously. For example, the formation of the second layer 634 may at least partially bind the second layer 634 with the first layer 632. Similarly, the formation of the third layer 636 adjacent the second layer 634 may at least partially bind the third layer 636 with the second layer 634.

In another embodiment, the formation of at least one of the layers 632, 634, 636 and the binding of the at least one of the layers 632, 634, 636 with another one of the layers 632, 634, 636 may occur sequentially. For example, the second layer 634 may be formed adjacent or atop the first layer 632 in one process, and the second layer 634 may be bound, fused, or otherwise coupled with the first layer 632 in a subsequent process (e.g., a heating process, a pressing process, etc.). Similarly, the third layer 636 may be formed adjacent the second layer 634 in one process, and the third layer 636 may be coupled with the second layer 634 in a subsequent process. The layering device 604 may bind or fuse the first layer 632, the second layer 634, the third layer 636, and/or any subsequent layers (not shown) with one another to fabricate the acoustic attenuator 200.

The formation and binding of the first layer 632, the second layer 634, the third layer 636, and/or any subsequent layers (not shown) in the second process 620 may include any additive manufacturing process known in the art. Illustrative additive manufacturing processes include, but are not limited to, VAT photopolymerization, power bed fusion, binder jetting, material jetting, sheet lamination, material extrusion, directed energy deposition (DED), and hybrid. For example, the formation and binding of the layers 632, 634, 636 may be carried out at least in part by a VAT photopolymerization process, such as a stereolithography apparatus (SLA), digital light processing (DLA), scan, spin, and selectively photocure (3SP), continuous liquid interface production (CLIP), or a modification of one of the foregoing. In at least one embodiment, the VAT photopolymerization process may include lowering a build platform into a vat or container containing ultraviolet-curable photopolymer resin to a depth of the thickness of the layer to be formed, and selectively exposing the resin via a laser or projector to an ultraviolet light, which initiates polymerization and conversion of the exposed areas of resin to a solidified layer. Optionally, a blade may be utilized to provide a smooth resin base on which to construct the subsequent layer.

In another example, the formation and binding of the layers 632, 634, 636 may be carried out at least in part by a power bed fusion process, such as selective laser melting (SLM), selective laser sintering (SLS), selective heat sintering (SHS), electron beam melting (EBM), electron beam direct manufacturing (EBDM), direct metal laser sintering (DMLS), multi-jet fusion (MJF), or a modification of one of the foregoing. As will be discussed in further detail below, the powder bed fusion process may utilize a laser or electron bean to melt and fuse powdered material together to form each layer.

In another example, the formation and binding of the layers 632, 634, 636 may include a binder jetting process, such as 3D printing (3DP), ExOne, Voxeljet, or a modification of one of the foregoing. In at least one embodiment, the binder jetting process may include spreading powdered material over a build platform via a roller, selectively depositing liquid bonding agents (e.g., binders) onto the powdered material, lowering the build platform by the layer's thickness, and applying another layer of powdered material, thereby forming the layer where the powdered material is bound to the liquid binder. The foregoing process may then be repeated for each subsequent layer. The binders may include organic and inorganic materials. In the case of the powdered materials being or including metals or ceramics, the binder jetting process may further include firing each layer formed therefrom in a furnace.

In another example, the formation and binding of the layers 632, 634, 636 may be carried out at least in part by a material jetting process, such as polyjet, smooth curve printing (SCP), multi-jet modeling (MJM), projet, or a modification of one of the foregoing. In at least one embodiment, the material jetting process may include positioning a print head above a build platform, selectively depositing droplets of molten material from the print head to the surface of the build platform using either a thermal or piezoelectric method, and allowing for the solidification of the droplets by cooling or ultraviolet light to form the layer. The foregoing process may then be repeated for each subsequent layer.

In another example, the formation and binding of the layers 632, 634, 636 may be carried out at least in part by a sheet lamination process, such as laminated object manufacture (LOM), selective deposition lamination (SDL), ultrasonic additive manufacturing (UAM), or a modification of one of the foregoing. In at least one embodiment, the sheet lamination process may include coupling stacked sheets of material via ultrasonic welding, brazing, or adhesive to form each layer. The sheet lamination process may further include cutting the desired shape of the layer via a laser or a blade. The foregoing process may then be repeated for each subsequent layer.

In another example, the formation and binding of the layers 632, 634, 636 may be carried out at least in part by a material extrusion process, such as fused filament fabrication (FFF), fused deposition modeling (FDM), or a modification of one of the foregoing. In at least one embodiment, the material extrusion process may include selectively depositing a molten material via a nozzle onto a build platform to form a layer, selectively depositing additional molten material via the nozzle onto the first layer, and fusing the layers together. The foregoing process may then be repeated for each subsequent layer.

In another example, the formation and binding of the layers 632, 634, 636 may include a directed energy deposition process, such as direct metal deposition (DMD), laser metal deposition (LMD), laser engineered net shaping (LENS), or a modification of one of the foregoing. As will be discussed in further detail below, the directed energy deposition process may include delivering a build material (e.g., the feedstock) into a path (e.g., energy beam) of a high powered laser to form a molten pool of the powdered material, and solidifying the molten pool to form each of the layers 632, 634, 636.

In another example, the formation and binding of the layers 632, 634, 636 may be carried out at least in part by a hybrid process. In one or more embodiments, the hybrid process may include a combination of LMD and computer numerical control (CNC) machining, which allows for additive manufacturing and subtractive manufacturing to be performed in a single machine to allow for one or more of the layers 632, 634, 636 to be constructed from either additive manufacturing or subtractive manufacturing.

Figure 7:
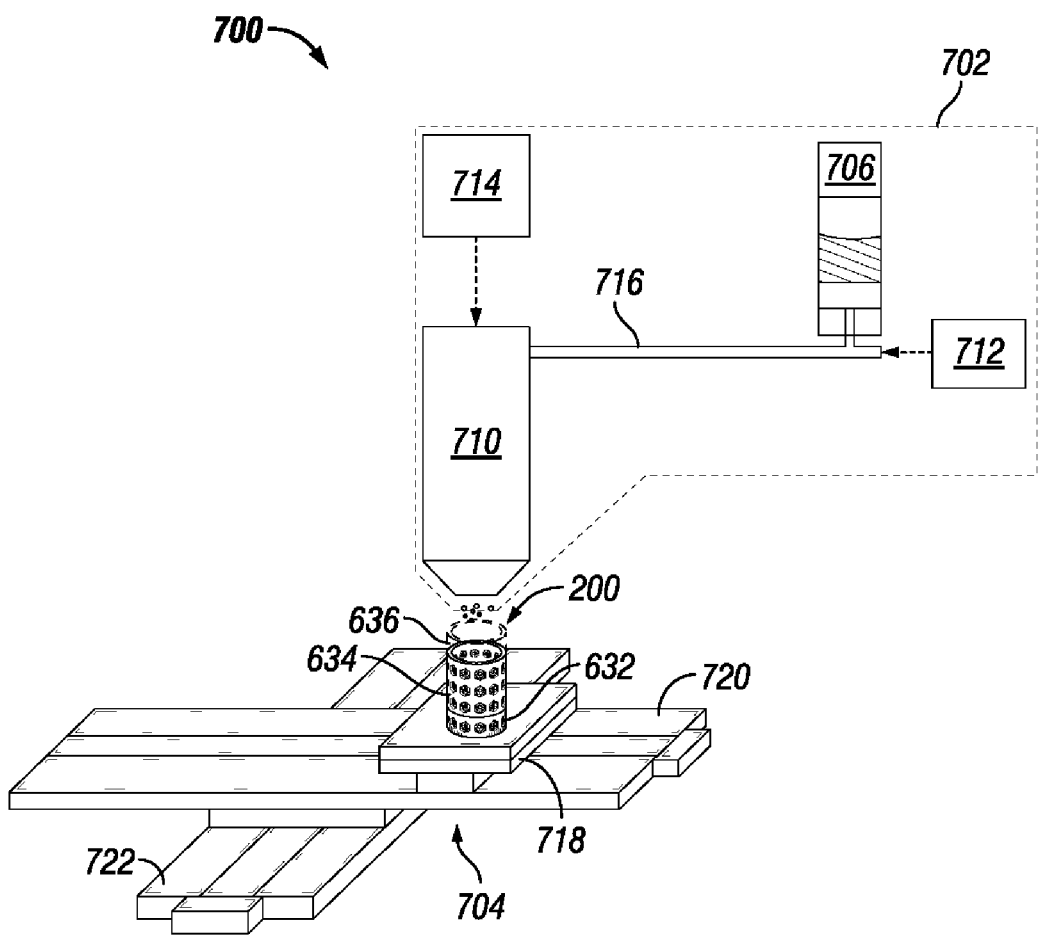
FIG. 7 is schematic of a non-limiting layering device that may be utilized in the system of FIG. 6.

Turning now to FIG. 7, this figure illustrates an exemplary layering device 700 that may be utilized in the system 600 of FIG. 6, according to one or more embodiments. The layering device 700 may be configured to form and/or bind the layers 632, 634, 636 of the acoustic attenuator 200 with one another to form the acoustic attenuator 200. For example, the layering device 700 may be configured to deposit successive layers 632, 634, 636 of one or more molten materials onto a substrate and/or any one or more of the layers 632, 634, 636 of the acoustic attenuator 200, and bind the layers 632, 634, 636 with one another to form the acoustic attenuator 200. In other embodiments, the layering device 700 may be utilized as described herein to form one or more of the acoustic attenuators 300, 400, and 500. As arranged, the layering device 700 may be configured to carry out or perform a directed energy deposition process, such as a DMD process, a LENS process, and/or a modification thereof.

As illustrated in FIG. 7, the layering device 700 may include a fabrication assembly 702 and a stage 704 (e.g., an x,y-axis stage). The fabrication assembly 702 may include one or more feeders (one shown 706), a deposition nozzle 710, a gas supply 712, a heat source (e.g., laser) 714, or any combination thereof. The feeder 706 may be configured to retain and dispense the material used to fabricate the acoustic attenuator 200.

For example, the feeder 706 may contain the material used to fabricate the acoustic attenuator 200 and may be configured to deliver the material to a conduit 716 fluidly coupled therewith. The material may be dispensed from the feeder 706 at a controlled rate and subsequently mixed with a gas (e.g., inert gas) from the gas supply 712. The gas from the gas supply 712 may carry or feed the material to the deposition nozzle 710 via the conduit 716. The material may be dispensed from the deposition nozzle 710 and melted by the laser 714 or an energy beam thereof to form a molten material, and the molten material may be deposited onto a substrate 718 to form each of the layers 632, 634, 636 of the acoustic attenuator 200. The dispensing of the material from the deposition nozzle 710, the melting of the material by the laser 714, and/or the deposition of the molten material may occur substantially simultaneously or sequentially.

As the material is deposited, the stage 704 may be translated or moved in a desired pattern to form each of the layers 632, 634, 636 of the acoustic attenuator 200. The desired pattern may be determined, at least in part, by the digital model 606 (see FIG. 6). The stage 704 may be configured to move the substrate in at least two dimensions. For example, the stage 704 may include an X-axis track 720 and a Y-axis track 722 configured to move the substrate 718 along an X-axis and a Y-axis, respectively. In at least one embodiment, the deposition nozzle 710 and/or the stage 704 may be configured to move along a Z-axis. For example, the stage 704 may be configured to move along the Z-axis to raise or lower the substrate 718 relative to the deposition nozzle 710.

Figure 8:
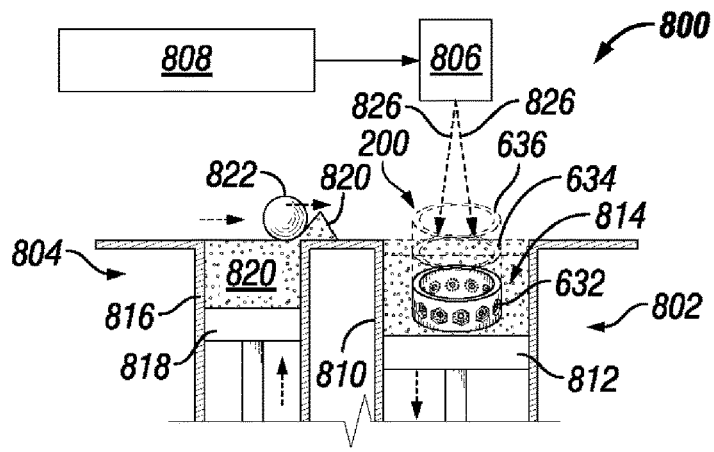
FIG. 8 is another non-limiting layering device that may be utilized in the system of FIG. 6.

FIG. 8 illustrates another exemplary layering device 800 that may be utilized in the system 600 of FIG. 6, according to one or more embodiments. The layering device 800 may be configured to form and/or bind the layers 632, 634, 636 with one another to form the acoustic attenuator 200. In other embodiments, the layering device 800 may be utilized as described herein to form one or more of the acoustic attenuators 300, 400, and 500. As arranged, the layering device 800 may be configured to carry out or perform a powder bed fusion process, such as a DMLF process, a DMLS process, and/or a modification thereof. As illustrated in FIG. 8, the layering device 800 may include a fabrication assembly 802, a powder assembly 804, a scanner 806, and a heat source 808, such as a laser, or any combination thereof.

As further illustrated in FIG. 8, the fabrication assembly 802 may include a feedstock or powder container 810 configured to contain a build material 820 (e.g., the powdered materials) and having a component support 812 disposed therein. The component support 812 may be configured to carry or hold the acoustic attenuator 200 during one or more fabrication processes of the layering device 800. The component support 812 may be adjustable or movable within the build container 810 in a vertical direction (e.g., z-axis) and may be movable to define a working volume 814 (shown in phantom) of the layering device 800. The powder assembly 804 may include a powder chamber 816 having a delivery support 818 configured to support the powdered materials 820. The delivery support 818 may be adjustable or movable within the powder chamber 816 in the vertical direction (e.g., z-axis). The powder assembly 804 may also include a roller or wiper 822 configured to transfer at least a portion of the powdered materials 820 from the powder assembly 804 to the fabrication assembly 802.

In at least one embodiment, the scanner 806 may focus or direct an energy beam, illustrated by arrows 826, along the working volume 814 to fuse the powdered materials 820 contained in the working volume 814 with one another to form the layers 632, 634, 636 of the acoustic attenuator 200. In another embodiment, the laser 808 may be translated or moved along an x-axis and/or a y-axis to direct the energy beam 826 thereof along the working volume 814. For example, the laser 808 may be mounted with a movable platform or frame (not shown) configured to translate the laser 808 along the x-axis and/or the y-axis.

In an exemplary operation of the layering device 800 with continued reference to FIG. 8, the delivery support 818 may be raised in the vertical direction to supply a portion of the powdered materials 820 disposed in the powder chamber 816 to the wiper 822, and the component support 812 may be lowered to provide an empty volume (i.e., the working volume 814) in the build container 810. The wiper 822 may spread or otherwise push the portion of the powdered materials 820 from the powder assembly 804 to the empty volume in the build container 810 to thereby form the working volume 814 of the powdered materials 820 in the fabrication assembly 802.

The laser 808 and/or the scanner 806 may emit or otherwise focus the energy beam 826 onto the powdered materials 820 contained in the working volume 814 to selectively melt, sinter, or otherwise fuse at least a portion of the powdered materials 820 with one another to form the first layer 632 of the acoustic attenuator 200. For example, the energy beam 826 may selectively melt or fuse the powdered materials 820 into larger structures or agglomerations (e.g., molten powdered materials) by rapidly melting the powdered materials 820. As the energy beam 826 moves along the working volume 814 to melt or fuse the powdered materials 820, heat may be conducted from the previously melted or molten region of the working volume 814 to thereby rapidly cool and solidify the molten powdered materials 820 and form the metal alloy. As further described herein, the laser 808 and/or the energy beam 826 thereof may be configured to stir, blend, or otherwise mix the molten powdered materials 820 while concurrently melting the powdered materials 820 to form the respective metal alloy of each of the layers 632, 634, 636 of the acoustic attenuator 200. After forming the first layer 632 of the acoustic attenuator 200, at least a portion of the powdered materials 820 in the working volume 814 may be melted and/or sintered to the metal alloy and another portion of the powdered materials 820 may be unmelted or unsintered.

After forming the first layer 632 of the acoustic attenuator 200, the component support 812 may be lowered to thereby lower the first layer 632 of the acoustic attenuator 200, and the delivery support 618 may be raised to supply another portion of the powdered materials 620 from the build container 816 to the wiper 822. The wiper 822 may spread the portion of the powdered materials 820 from the powder assembly 804 to the build container 810 to thereby form another working volume 814 of the powdered materials 820 in the fabrication assembly 802.

The laser 808 may emit the energy beam 826 onto the powdered materials 820 forming the working volume 814 to selectively melt at least a portion of the powdered materials 820 into the larger structures or agglomerations (e.g., the molten powdered materials). Heat may be conducted from the previously molten region of the working volume 814 to thereby rapidly cool and solidify the molten powdered materials 820 to the metal alloy and form the second layer 634 (shown in phantom) of the acoustic attenuator 200. The fabrication process may be repeated to build the successive layers 632, 634, 636 of the acoustic attenuator 200. As previously discussed, the formation of the second layer 634 may bind or couple the second layer 634 with the first layer 632. Further, as previously discussed, the second layer 634 may be coupled with the first layer 632 in a subsequent process (e.g., a heating and/or pressing process)

Figure 9A:
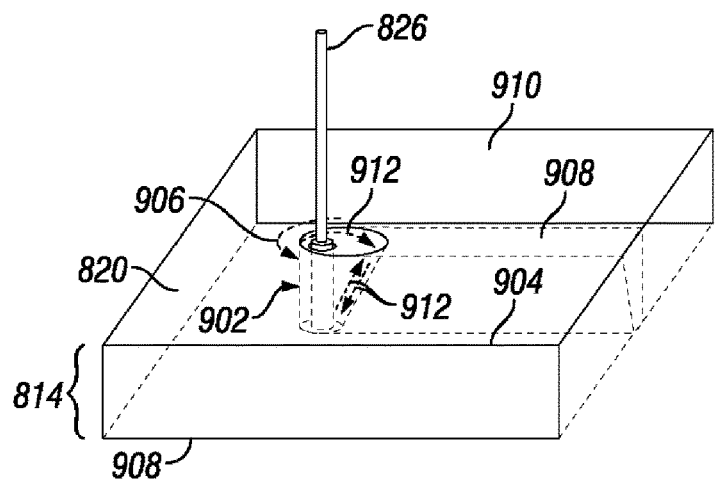
FIG. 9A is a non-limiting schematic of an energy beam that may be used for melting and stirring a powdered material such as may be used without limitation to form the layers of the acoustic attenuator depicted in FIGS. 2A and 2B.
Figure 9B:
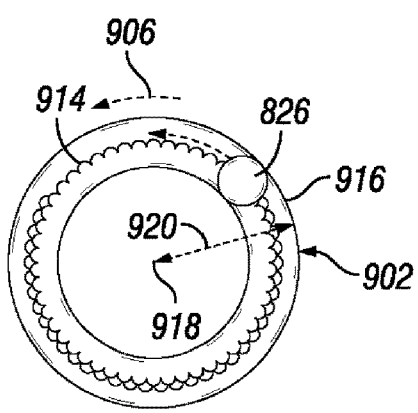
FIG. 9B is a plan view of an exemplary path of the energy beam of FIG. 9A.

As previously discussed, the laser 808 and/or the energy beam 826 thereof may be configured to concurrently melt and stir the powdered materials 820 to form the metal alloy of each of the layers 632, 634, 636. FIG. 9A illustrates a schematic of the energy beam 826 melting and stirring the powdered material 820 to form the layers 632, 634, 636 of the acoustic attenuator 200 of FIGS. 2A and 2B, according to one or more embodiments. FIG. 9B depicts a plan view of an exemplary path of the energy beam 826 of FIG. 9A, according to one or more embodiments. In other embodiments, the energy beam 826 may be utilized as described herein to form the layers of one or more of the acoustic attenuators 300, 400, and 500.

As illustrated in FIG. 9A, the energy beam 826 may be focused or directed along a portion of the working volume 814 to melt the powdered materials 820 contained therein and at least partially define a working region 902 of the energy beam 826 in the working volume 814. For example, the energy beam 826 may be directed along a top portion or surface 904 of the working volume 814 in any path to at least partially define the working region 902. As illustrated in FIG. 9A and further illustrated in detail in FIG. 9B, the energy beam 826 may be directed along the top surface 904 in a substantially circular path 906 to least partially define the working region 902. The working region 902 may extend from the top surface 904 of the working volume 814 to a bottom portion or surface 908 of the working volume 814. For example, the energy beam 826 may be configured to melt at least a portion of the powdered materials 820 disposed between the top and bottom surfaces 904, 908 of the working volume 814. As illustrated in FIG. 9A, the working region 902 may be a substantially frustum shaped portion of the working volume 814 extending between the top surface 904 and the bottom surface 908.

The energy beam 826 may be directed along the working volume 814 to melt the powdered materials 820. For example, as the energy beam 826 is directed along the top surface 904 of the working volume 814, the energy beam 826 may melt the powdered materials 820 contained in the working region 902. As the energy beam 826 moves along the working volume 814 to melt and stir the molten powdered materials 820, heat may be conducted from the working region 902 to rapidly cool and solidify the molten powdered materials 820 and form the metal alloy of each of the layers 632, 634, 636 of the acoustic attenuator 200 (see FIG. 6). For example, as illustrated in FIG. 9A, as the heat is conducted from the working region 902 to solidify the molten powdered materials 820, a first portion 908 of the powdered materials 820 in the working volume 814 may be sintered and solidified to the metal alloy, and another portion 910 of the powdered materials 820 in the working volume 814 may be unmelted or unsintered.

As illustrated by arrows 912 in FIG. 9A, a portion of the molten powdered materials 820 may flow or circulate within the working region 902. The flow or circulation 912 of the molten powdered materials 820 may mix or stir the molten powdered materials 820. The flow or circulation 912 of the molten powdered materials 820 within the working region 902 may be facilitated and/or promoted by the path 906 of the energy beam 826. For example, the substantially circular path 906 of the energy beam 826 may facilitate and/or promote the flow 912 of the molten powdered materials 820 within and/or about the working region 902. As illustrated in FIG. 9A, the substantially circular path 906 of the energy beam 826 may also promote the flow 912 of the molten powdered materials 820 between the top surface 904 and the bottom surface 908 of the working volume 814.

The energy beam 826 may be oscillated to facilitate and/or promote the flow 912 of the molten powdered materials 820 within the working region 902. For example, the energy beam 826 may be oscillated while concurrently following the substantially circular path 906. The energy beam 826 may be oscillated in any direction and/or pattern. For example, as illustrated by line 914 in FIG. 9B, the energy beam 826 may oscillate radially while following the circular path 906. The energy beam 826 may oscillate radially from an outer circumference 916 of the working region 902 toward a center 918 of the working region 902. In at least one embodiment, the energy beam 826 may oscillate along a radial length 920 of the working region 902 extending between the outer circumference 916 and the center 918. In another embodiment, the energy beam 826 may oscillate along a portion of the radial length 920. The radial oscillation 914 and/or the circular path 906 of the energy beam 826 may facilitate and/or promote the flow 912 of the molten powdered materials 820 in the working region 902 to thereby promote the mixing of the molten powdered materials 820.

The formation and binding of the layers in any of the acoustic attenuators 200, 300, 400, 500 in any of the layering devices 604, 700, 800 described herein may be conducted or performed in an inert environment. For example, the melting, stirring, and/or cooling of the powdered materials by the layering devices 604, 700, 800 described herein may be conducted under vacuum or in the presence of one or more inert gases, such as argon and helium. The inert environment may prevent oxidation of the powdered materials during one or more processes (e.g., heating) of fabricating the acoustic attenuators 200, 300, 400, 500.

The acoustic attenuators 200, 300, 400, 500 fabricated with the layering devices 604, 700, 800 described herein may be subjected to one or more post-fabrication processes. The post-fabrication processes may include one or more heating and/or pressing processes. For example, the acoustic attenuators 200, 300, 400, 500 may be subjected to one or more pre-sintering processes to remove the additives (e.g., the lubricants and/or the binders) contained therein. The pre-sintering process may include heating the acoustic attenuators 200, 300, 400, 500 under vacuum and/or in an inert environment. The pre-sintering process may include heating the acoustic attenuators 200, 300, 400, 500 to a temperature of about 500° C. to about 1400° C. The acoustic attenuators 200, 300, 400, 500 may also be subjected to one or more sintering processes to further fuse or bind the powdered materials with one another.

The heating and pressing process may increase the density, strength, toughness, and/or hardness of the acoustic attenuators 200, 300, 400, 500. Illustrative heating and pressing processes may include, but are not limited to, vacuum sintering, hot isostatic pressing (HIP), or any combination thereof. It should appreciated that any of the heating and pressing processes may be conducted in an inert environment (e.g., under vacuum and/or in the presence of the inert gases). The acoustic attenuators 200, 300, 400, 500 fabricated with the layering devices 604, 700, 800 may also be subjected to one or more machining and/or shaping processes. For example, the acoustic attenuators 200, 300, 400, 500 fabricated by the layering devices 604, 700, 800 may be subjected to the machining processes to define additional features (e.g., undercuts, holes, flanges, etc.) to the acoustic attenuators 200, 300, 400, 500. Illustrative machining and/or shaping processes may include, but are not limited to, drilling, milling, cutting, grinding, or the like, or any combination thereof.

Figure 10:
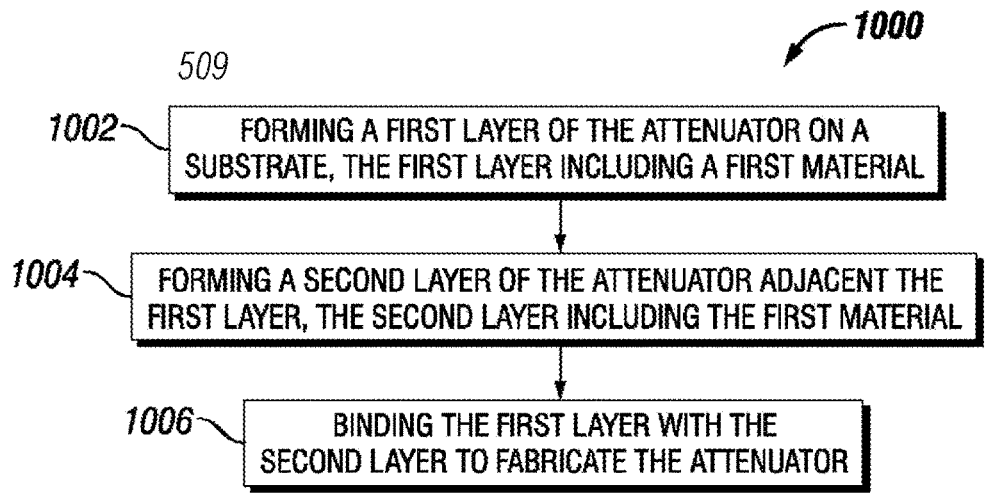
FIG. 10 is one top-level flowchart depicting non-limiting methodology that may used for fabricating disclosed acoustic attenuators.

FIG. 10 illustrates a flowchart depicting a method 1000 for fabricating an attenuator, according to one or more embodiments. The method 1000 may include forming a first layer of the attenuator on a substrate, the first layer including a first material, as shown at 1002. The method 1000 may also include forming a second layer of the attenuator adjacent the first layer, the second layer including the first material, as shown at 1004. The method 1000 may further include binding the first layer with the second layer to fabricate the attenuator, as shown at 1006.

Figure 11:
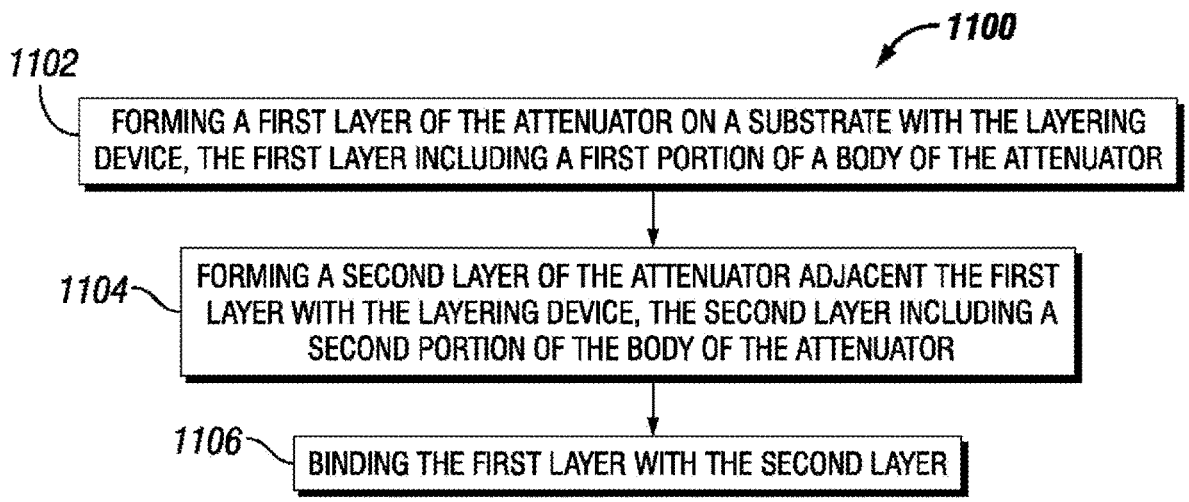
FIG. 11 is another top-level flowchart depicting non-limiting methodology that may used for fabricating disclosed acoustic attenuators.

FIG. 11 illustrates a flowchart depicting a method 1100 for fabricating an attenuator with a layering device, according to one or more embodiments. The method 1100 may include forming a first layer of the attenuator on a substrate with the layering device, the first layer including a first portion of a body of the attenuator, as shown at 1102. The method 1100 may also include forming a second layer of the attenuator adjacent the first layer with the layering device, the second layer including a second portion of the body of the attenuator, as shown at 1104. The method 1100 may further include binding the first layer with the second layer, as shown at 1106.

Figure 12:
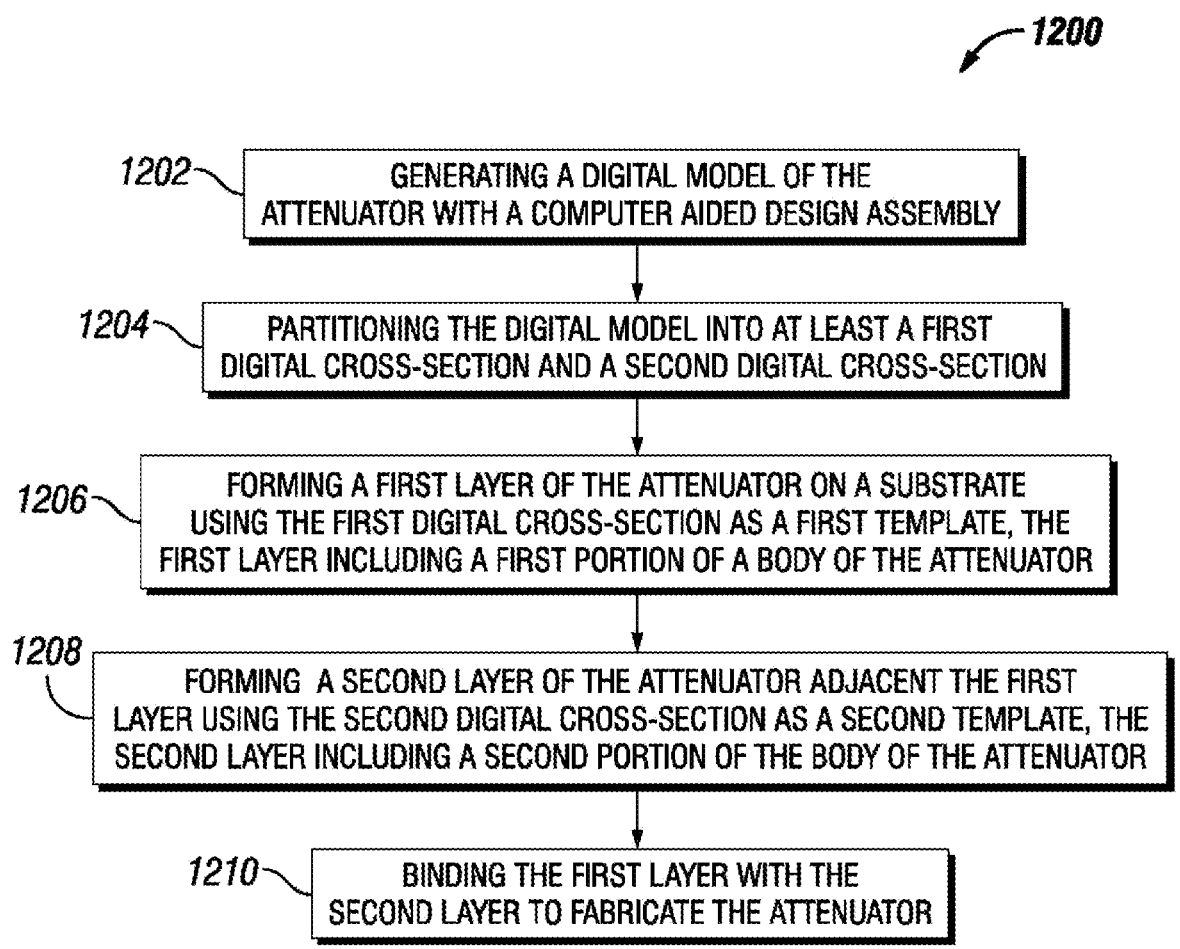
FIG. 12 is a flowchart depicting non-limiting methodology that may be used for fabricating disclosed acoustic attenuators, such as via a non-limiting additive manufacturing process.

FIG. 12 illustrates a flowchart depicting a method 1200 for fabricating an attenuator via an additive manufacturing process, according to one or more embodiments. The method 1200 may include generating a digital model of the attenuator with a computer aided design assembly, as shown at 1202. The method 1200 may also include partitioning the digital model into at least a first digital cross-section and a second digital cross-section, as shown at 1204. The method 1200 may further include forming a first layer of the attenuator on a substrate using the first digital cross-section as a first template, as shown at 1206. The first layer may include a first portion of a body of the attenuator. The method 1200 may also include forming a second layer of the attenuator adjacent the first layer using the second digital cross-section as a second template, as shown at 1208. The second layer may include a second portion of the body of the attenuator. The method 1200 may also include binding the first layer with the second layer to fabricate the attenuator, as shown at 1210.

FIG. 13 is a flow chart listing certain steps that may be used in a method for manufacturing disclosed acoustic resonators, as may be used in turbomachinery. As shown in FIG. 13, after a start step 1300, step 1302 allows generating a computer-readable three-dimensional (3D) model, such as a computer aided design (CAD) model, of a disclosed acoustic resonator. The model defines a digital representation of any of the disclosed acoustic resonators, as described above in the context of the preceding figures.

Prior to return step 1306, step 1304 allows manufacturing the acoustic attenuator using an additive manufacturing technique in accordance with the generated three-dimensional model. Non-limiting examples of additive manufacturing techniques may include laser sintering, selective laser melting (SLM), direct metal laser sintering (DMLS), electron beam sintering (EBS), electron beam melting (EBM), etc. It will be appreciated that once a model has been generated, or otherwise available (e.g., loaded into a 3D digital printer, or loaded into a processor that controls the additive manufacturing technique), then manufacturing step 1304 need not be preceded by a generating step 1302. It will be further appreciated that the entire acoustic attenuator, or one or more components of the acoustic attenuator, e.g., cover, may be formed as respective unitized structures using additive manufacturing in accordance with the generated three-dimensional model.

FIG. 14 is a flow chart listing further steps that may be used in the disclosed method for manufacturing the acoustic attenuator. In one non-limiting embodiment, manufacturing step 1304 (FIG. 13) may include the following: after a start step 1308, step 1310 allows processing the model in a processor into a plurality of slices of data that define respective cross-sectional layers of the acoustic attenuator. As described in step 1312, at least some of the plurality of slices define one or more voids (e.g., respective voids that may be used to form hollow portions of acoustic attenuator, such as pockets and/or conduits) within at least some of the respective cross-sectional layers of the acoustic attenuator. Prior to return step 1316, step 1314 allows successively forming each layer of the acoustic resonator by fusing metallic or non-metallic powder using a suitable source of energy, such as without limitation, lasing energy or electron beam energy.

FIG. 15 is a flow sequence in connection with a disclosed method for manufacturing a 3D object 1332, such as any of the disclosed acoustic resonators. A computer-readable three-dimensional (3D) model 1324, such as a computer aided design (CAD) model, of the 3D object may be processed in a processor 1326, where a slicing module 1328 converts model 1324 into a plurality of slice files (e.g., 2D data files) that defines respective cross-sectional layers of the 3D object. Processor 1326 may be configured to control an additive manufacturing technique 1330 used to make 3D object 1332.

It should be appreciated that all numerical values and ranges disclosed herein are approximate valves and ranges, whether "about" is used in conjunction therewith. It should also be appreciated that the term "about," as used herein, in conjunction with a numeral refers to a value that is +/−5% (inclusive) of that numeral, +/−10% (inclusive) of that numeral, or +/−15% (inclusive) of that numeral. It should further be appreciated that when a numerical range is disclosed herein, any numerical value falling within the range is also specifically disclosed.

In operation, disclosed embodiments of acoustic attenuators for a turbomachine, and methodology for three-dimensionally fabricating such acoustic attenuators are effective to make acoustic attenuators with practically no drooping and/or without supports. This is effective to reduce both print time, waste of material, and post processing time. Disclosed embodiments may involve acoustic attenuators that can be printed, as a unitary structure with a cover and/or may involve pocket arrays constructed in an annular body, where such arrays may be constructed both axially and radially within the annular body.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An acoustic attenuator for a turbomachine, the acoustic attenuator comprising:
   an annular body having an outer surface and an inner surface, the inner surface of the annular body defining a bore extending along a longitudinal axis of the acoustic attenuator between a first end and a second end of the acoustic attenuator, the annular body formed by a plurality of axially-successive cross-sectional layers unitized between the first end and the second end of the acoustic attenuator, the plurality of axially-successive cross-sectional layers transversely disposed relative to the longitudinal axis of the acoustic attenuator; and
   at least some axially-successive cross-sectional layers of the plurality of axially-successive cross-sectional layers defining a pocket disposed between the outer surface and the inner surface of the annular body,
   wherein at least a segment of a periphery of the pocket comprises two sides arranged to join at a common end point to form an apex of the pocket, wherein the at least some axially-successive cross-sectional layers further define a radially-inward pocket relative to the pocket disposed between the outer surface and the inner surface of the annular body, and first and second sets of conduits,
   wherein the radially inward pocket is substantially aligned with the pocket and wherein the aligned pockets and the corresponding conduits are disposed in a nested relationship.

2. The acoustic attenuator of claim 1, wherein the common end point that forms the apex of the pocket is defined by an axially-leading cross-sectional layer of the at least some of the axially-successive cross-sectional layers that define the pocket.

3. The acoustic attenuator of claim 1, wherein a respective side of the two sides arranged to join at the common end point defines a respective angle (θ) relative to a line that bisects the pocket along the longitudinal axis of the acoustic attenuator, wherein the respective angle is selected so that the plurality of axially-successive cross-sectional layers is self-supporting.

4. The acoustic attenuator of claim 1, wherein the respective angle (θ) comprises an angular value less than in a range from about 45 degrees to about 70 degrees.

5. The acoustic attenuator of claim 1, wherein the two sides arranged to join at a common end point to form the apex of the pocket comprise straight sides.

6. The acoustic attenuator of claim 3, wherein a cross-sectional shape of the pocket is selected from the group consisting of a polygonal cross-sectional shape, a conic cross-sectional shape, and a combination of two or more of said cross-sectional shapes.

7. The acoustic attenuator of claim 1, wherein the at least some of the axially-successive cross-sectional layers that define the pocket further defining a set of conduits arranged to provide fluid communication between the pocket and the bore.

8. The acoustic attenuator of claim 1, wherein at least a segment of a periphery of a respective conduit of the set of conduits comprises two sides arranged to join at a common end point to form an apex of the conduit.

9. The acoustic attenuator of claim 8, wherein the common end point that forms the apex of the respective conduit is defined by an axially-leading cross-sectional layer of the at least some of the axially-successive cross-sectional layers that define the respective conduit.

10. The acoustic attenuator of claim 9, wherein a cross-sectional shape of the respective conduit is selected from the group consisting of a polygonal cross-sectional shape, a conic cross-sectional shape, and a combination of two or more of said cross-sectional shapes.

11. The acoustic attenuator of claim 1, wherein the outer surface of the annular body defines a boundary of a cover of the acoustic attenuator configured to enclose the pocket, wherein the cover and the annular body constitute a unitary structure.

12. The acoustic attenuator of claim 1,
   wherein at least a segment of a periphery of the radially-inward pocket comprises two sides arranged to join at a common end point to form an apex of the radially-inward pocket.

13. The acoustic attenuator of claim 12, wherein the common end point that forms the apex of the radially-inward pocket is defined by an axially-leading cross-sectional layer of the at least some of the axially-successive cross-sectional layers that define the radially-inward pocket.

14. The acoustic attenuator of claim 13, wherein a respective side of the two sides arranged to join at a common end point to form the apex of the radially-inward pocket defines a respective angle (θ) relative to a line that bisects the radially-inward pocket along the longitudinal axis of the acoustic attenuator, wherein the respective angle is selected so that the plurality of axially-successive cross-sectional layers is self-supporting.

15. The acoustic attenuator of claim 14, wherein the respective angle (θ) comprises an angular value less than in a range from about 45 degrees to about 70 degrees.

16. The acoustic attenuator of claim 14, wherein the two sides arranged to join at a common end point to form the apex of the radially-inward pocket comprise straight sides.

17. The acoustic attenuator of claim 14, wherein a cross-sectional shape of the radially-inward pocket is selected from the group consisting of a polygonal cross-sectional shape, a conic cross-sectional shape, and a combination of two or more of said cross-sectional shapes.

18. The acoustic attenuator of claim 12, wherein the first set of conduits is arranged to provide fluid communication between the pocket and the radially-inward pocket, and the second set of conduits is arranged to provide fluid communication between the radially-inward pocket and the bore.

19. A method for manufacturing an acoustic attenuator for a turbomachine, the method comprising:

generating a computer-readable three-dimensional (3D) model of the acoustic attenuator, the model defining a digital representation comprising:

an annular body having an outer surface and an inner surface, the inner surface of the annular body defining a bore extending along a longitudinal axis of the acoustic attenuator between a first end and a second end of the acoustic attenuator, the annular body formed by a plurality of axially-successive cross-sectional layers disposed between the first end and the second end of the acoustic attenuator, the plurality of axially-successive cross-sectional layers transversely disposed relative to the longitudinal axis of the acoustic attenuator; and at least some axially-successive cross-sectional layers of the plurality of axially-successive cross-sectional layers defining a pocket disposed between the outer surface and the inner surface of the annular body, wherein at least a segment of a periphery of the pocket comprises two sides arranged to join at a common end point to form an apex of the pocket, wherein a respective side of the two sides arranged to join at the common end point defines a respective angle (θ) relative to a line that bisects the pocket along the longitudinal axis of the acoustic attenuator, wherein the respective angle is selected so that the plurality of axially-successive cross-sectional layers is self-supporting, wherein the at least some of the axially-successive cross-sectional layers that define the pocket further defining a set of conduits arranged to provide fluid communication between the pocket and the bore;

wherein the at least some axially-successive cross-sectional layers further defining a radially-inward pocket relative to the pocket disposed between the outer surface and the inner surface of the annular body, and first and second sets of conduits, wherein the radially inward pocket is substantially aligned with the pocket, and wherein the aligned pockets and the corresponding conduits are disposed in a nested relationship; and manufacturing the acoustic attenuator using an additive manufacturing technique in accordance with the generated three-dimensional model, wherein the outer surface of the annular body defined by the model constitutes a boundary of a cover of the acoustic attenuator configured to enclose the pocket, wherein the cover and the annular body constitute a unitary structure.

\* \* \* \* \*